US008877823B2

(12) United States Patent
Glew et al.

(10) Patent No.: US 8,877,823 B2
(45) Date of Patent: *Nov. 4, 2014

(54) COMPOSITIONS FOR COMPOUNDING, EXTRUSION AND MELT PROCESSING OF FOAMABLE AND CELLULAR FLUOROPOLYMERS

(71) Applicant: Cable Components Group, LLC, Pawcatuck, CT (US)

(72) Inventors: Charles A. Glew, Charlestown, RI (US); Kenneth R. Boyle, Freehold, NJ (US); Bradley Lane Kent, Woolrich Township, NJ (US); Jeffrey A. Hrivnak, Arese (IT)

(73) Assignee: Cable Components Group, LLC, Pawcatuck, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,560

(22) Filed: Oct. 1, 2012

(65) Prior Publication Data
US 2013/0090398 A1 Apr. 11, 2013

Related U.S. Application Data

(63) Continuation of application No. 13/109,532, filed on May 17, 2011, now Pat. No. 8,278,366, which is a continuation of application No. 12/221,280, filed on Aug. 1, 2008, now Pat. No. 7,968,613.

(60) Provisional application No. 60/963,322, filed on Aug. 3, 2007, provisional application No. 60/953,729, filed on Aug. 3, 2007.

(51) Int. Cl.
C08J 9/06 (2006.01)
H01B 3/44 (2006.01)
C08J 9/08 (2006.01)
C08J 9/00 (2006.01)

(52) U.S. Cl.
CPC . C08J 9/06 (2013.01); H01B 3/445 (2013.01); C08J 9/08 (2013.01); C08J 2327/12 (2013.01); C08J 9/0066 (2013.01)
USPC ............ 521/91; 521/79; 521/80; 521/82; 521/50; 525/199; 525/200; 524/544; 524/545; 524/546

(58) Field of Classification Search
USPC .......................... 521/91, 79, 80, 82
See application file for complete search history.

(56) References Cited

U.S. PATENT DOCUMENTS

| 3,624,250 A | 11/1971 | Carlson |
| 4,029,868 A | 6/1977 | Carlson |
| 4,331,619 A | 5/1982 | Chung et al. |
| 4,394,460 A | 7/1983 | Chung et al. |
| 4,513,129 A | 4/1985 | Nakagawa et al. |
| 4,524,194 A | 6/1985 | Dumoulin |
| 4,711,811 A | 12/1987 | Randa |
| 4,739,024 A | 4/1988 | Moggi et al. |
| 4,982,009 A | 1/1991 | Hung |
| 5,229,432 A | 7/1993 | Muschiatti |
| 5,310,838 A | 5/1994 | Hung et al. |
| 5,571,462 A | 11/1996 | Hashimoto et al. |
| 5,610,203 A | 3/1997 | Buckmaster et al. |
| 5,677,404 A | 10/1997 | Blair |
| 5,688,885 A | 11/1997 | Blair |
| 5,703,185 A | 12/1997 | Blair |
| 5,883,197 A | 3/1999 | Barbieri et al. |
| 5,912,278 A | 6/1999 | Venkataraman |
| 5,959,022 A | 9/1999 | Lin et al. |
| 6,064,008 A | 5/2000 | Craton |
| 6,139,957 A | 10/2000 | Craton |
| 6,231,919 B1 | 5/2001 | Craton |
| 6,232,357 B1 | 5/2001 | Barbieri et al. |
| 6,395,795 B1 | 5/2002 | Hrivnak |
| 6,506,809 B2 | 1/2003 | Hrivnak |
| 6,512,013 B2 | 1/2003 | Hrivnak |
| 6,573,303 B2 | 6/2003 | Liu et al. |

(Continued)

FOREIGN PATENT DOCUMENTS

| EP | 413255 | * | 3/1996 |
| EP | 0413255 B1 | | 3/1996 |

(Continued)

OTHER PUBLICATIONS

Aclyn flyer, Honeywell, (2003).

(Continued)

Primary Examiner — Irina Krylova
(74) Attorney, Agent, or Firm — Thomas J. Engellenner; Reza Mollaaghababa; Pepper Hamilton LLP

(57) ABSTRACT

The present invention relates generally to a method for manufacturing a foamed article, which comprises providing a composition comprising a melt-processable perfluoropolymer and talc, said perfluoropolymer comprising at least 50 percent by weight of said composition and said talc comprising about 2 percent to 3 percent by weight of said composition; wherein said melt-processable perfluoropolymer is selected from the group consisting of tetrafluoroethylent/perfluoromethylvinyl ether copolymer (MFA), hexafluoropropylene/tetrafluoroethylene copolymer (FEP), and perfluroralkoxy (PFA) and any blend thereof. The composition is heated to a processing temperature of at least 600° F. at which talc functions as a foaming agent, thereby causing the foaming of said composition at a foaming rate in a range from 20% to 50% so as to form a foamed article. The talc is the only foaming agent in said composition and the foaming is achieved without gas injection. Further, hydrogen-containing fluoropolymers are absent from the composition.

9 Claims, 1 Drawing Sheet

(56) References Cited

U.S. PATENT DOCUMENTS

| | | | |
|---|---|---|---|
| 6,812,314 | B2 | 11/2004 | Lunardi et al. |
| 6,946,495 | B2 | 9/2005 | Zwynenburg et al. |
| 7,172,719 | B2 | 2/2007 | Jackson et al. |
| 7,202,418 | B2 | 4/2007 | Glew |
| 7,241,826 | B2 | 7/2007 | Shiotsuki et al. |
| 7,439,297 | B2 | 10/2008 | Abusleme et al. |
| 7,465,879 | B2 | 12/2008 | Glew |
| 7,473,849 | B2 | 1/2009 | Glew |
| 7,473,850 | B2 | 1/2009 | Glew |
| 7,968,613 | B2 * | 6/2011 | Glew et al. ............... 521/91 |
| 8,278,366 | B2 * | 10/2012 | Glew et al. ............... 521/91 |
| 8,318,819 | B2 * | 11/2012 | Glew ..................... 521/91 |
| 2002/0061934 | A1 | 5/2002 | Hrivnak |
| 2004/0198886 | A1 | 10/2004 | Shiotsuki et al. |
| 2005/0107517 | A1 * | 5/2005 | Abusleme et al. ......... 524/544 |
| 2005/0165165 | A1 | 7/2005 | Zwynenburg et al. |
| 2005/0199415 | A1 | 9/2005 | Glew |
| 2006/0237217 | A1 | 10/2006 | Glew |
| 2006/0237218 | A1 | 10/2006 | Glew |
| 2006/0237219 | A1 | 10/2006 | Glew |
| 2007/0052124 | A1 | 3/2007 | Park et al. |
| 2007/0102188 | A1 | 5/2007 | Glew |
| 2007/0203281 | A1 | 8/2007 | Alric et al. |
| 2007/0209825 | A1 | 9/2007 | Glew |
| 2008/0087454 | A1 | 4/2008 | Ohno et al. |
| 2008/0264670 | A1 | 10/2008 | Glew |
| 2008/0283271 | A1 | 11/2008 | Kenny et al. |
| 2009/0018225 | A1 | 1/2009 | Gemmel et al. |
| 2009/0048359 | A1 | 2/2009 | Glew et al. |
| 2009/0069480 | A1 | 3/2009 | Zangara et al. |
| 2010/0072644 | A1 | 3/2010 | Glew |
| 2010/0151243 | A1 | 6/2010 | Glew |
| 2010/0206609 | A1 | 8/2010 | Glew |
| 2010/0243291 | A1 | 9/2010 | Glew |
| 2011/0224318 | A1 | 9/2011 | Glew et al. |
| 2013/0090398 | A1 | 4/2013 | Glew et al. |

FOREIGN PATENT DOCUMENTS

| | | |
|---|---|---|
| EP | 1520880 A | 4/2005 |
| EP | 2176326 B1 | 7/2011 |
| EP | 2380923 A1 | 10/2011 |
| JP | 08-012796 A | 1/1991 |
| JP | 07-026050 A | 1/1995 |
| JP | 09-055120 A2 | 2/1997 |
| JP | 19-126631 A | 5/2007 |
| JP | 2007126631 A | 5/2007 |
| KR | 0129862 B1 | 4/1998 |
| KR | 10-2007-0004583 A | 1/2007 |
| WO | 97/15623 A1 | 5/1997 |
| WO | 03/000792 A1 | 1/2003 |
| WO | 2009/019209 A1 | 2/2009 |
| WO | 2009/020555 A2 | 2/2009 |
| WO | 2009/020554 A2 | 12/2009 |

OTHER PUBLICATIONS

Mineral Data Publishing, (2001), Talc.

Office Action for Mexican Application No. Mx/a/2009/008301 dated Sep. 22, 2011.

Extended European Search Report for European Application No. 11169333.9 dated Sep. 28, 2011.

Ewell, RH and Geller, RF, U.S. Department of Commerce, National Bureau of Standards, Research Paper RP848, "Thermal Decomposition of Talc", pp. 551-556 (1935).

PCT/EP2008/060119 International Search Report dated Dec. 29, 2008.

PCT/EP2008/060119 PCT Written Opinion of the International Searching Authority.

PCT/EP2008/060119 PCT International Preliminary Report on Patentability dated Feb. 9, 2010.

Office Action for Canadian Application No. 2663275 dated Sep. 30, 2013.

Reimer, DuPont fluoropolymers for electrical insulation, (Mar. 2008), press release, FLP-Wire-2008-04, Dusseldoft, Germany.

* cited by examiner

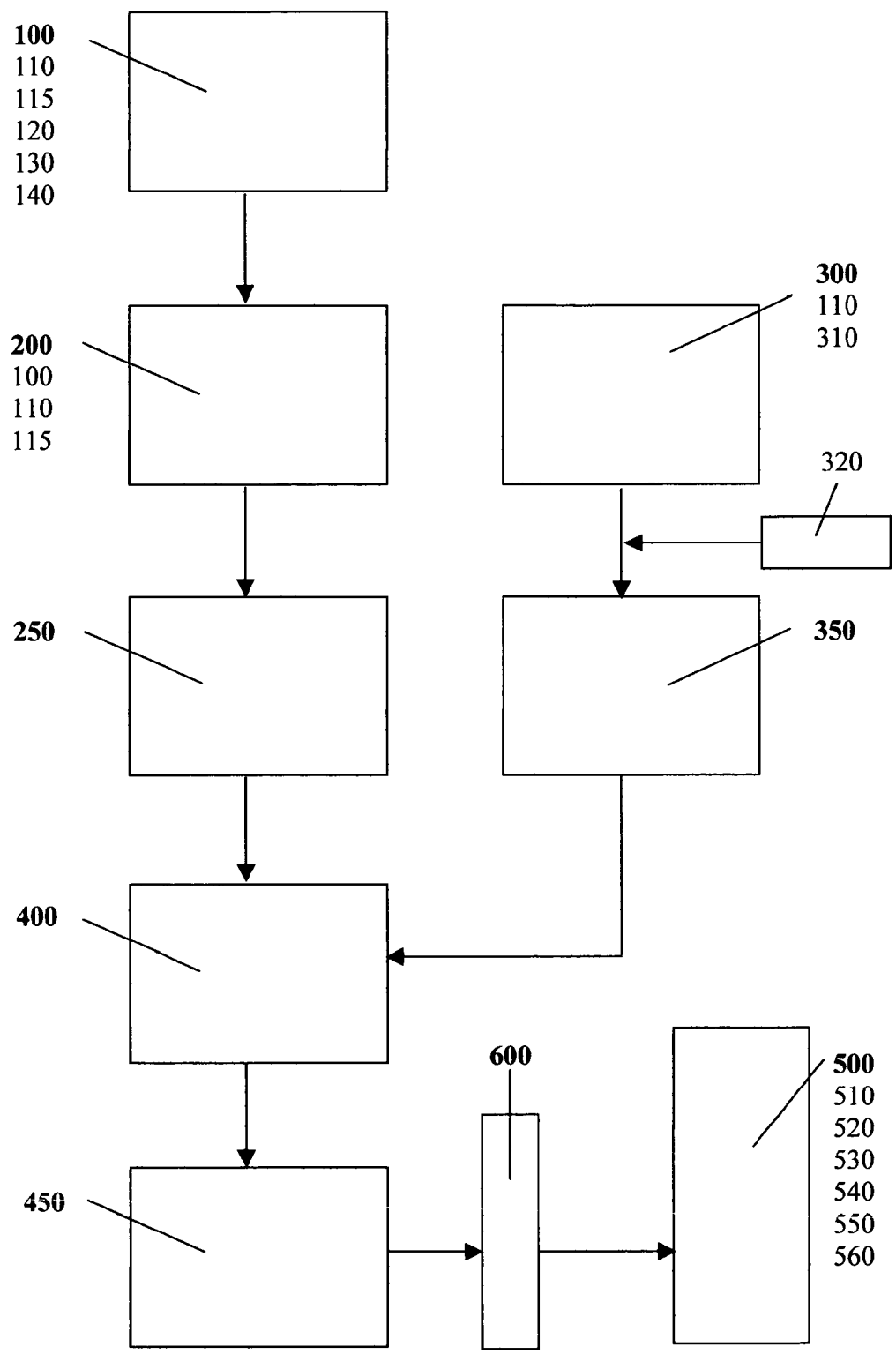

COMPOSITIONS FOR COMPOUNDING, EXTRUSION AND MELT PROCESSING OF FOAMABLE AND CELLULAR FLUOROPOLYMERS

CROSS-REFERENCE TO RELATED APPLICATIONS

This application is a continuation of U.S. patent application Ser. No. 13/109,532 titled "Compositions for Compounding, Extrusion and Melt Processing of Foamable and Cellular Fluoropolymers", filed May 17, 2011, which claims priority to U.S. application Ser. No. 12/221,280, titled, "Compositions for Compounding, Extrusion and Melt Processing of Foamable and Cellular Fluoropolymers", filed 1 Aug. 2008, which claims priority to U.S. Provisional Application No. 60/963,322, filed Aug. 3, 2007 and titled: "Compositions for Compounding and Extrusion of Foamed Fluoropolymers for Wire and Cable Applications" and U.S. Provisional Application No. 60/953,729, filed Aug. 3, 2007 and titled: "Perfluoropolymer Foamable Composition," each of which is hereby expressly incorporated by reference in its entirety.

FIELD OF INVENTION

Wire and cable applications, especially those using copper conductors, utilize the insulative properties of specific polymers over the conductors as insulation and over the entire cable core of insulated conductors as jackets. Cable fillers of varying shapes and size are used as well for their insulative properties and more specifically in communications designs to minimize pair-to-pair crosstalk within a cable as will as mitigating crosstalk between adjacent cables which is commonly referred to as "alien crosstalk." Jackets and cable fillers provide mechanical and physical properties as well as an ever evolving requirement for enhanced fire performance i.e. (reduced flame spread, ignitability, and smoke evolution.) These mechanical, physical and fire retardancy performance requirements apply to fiber optic cables as well. Cable design demands a balance of these performance requirements and the attributes of processing cellular foam improves both insulation values e.g. (lower crosstalk in communications cables) while lowering material content and therefore the amount of combustible materials used in a cable. These added performance characteristics through cellular or microcellular foaming can additionally lower cost of the overall cable design. This application relates to perfluoropolymer compositions suitable for wire insulation, cable fillers (e.g. crossweb, tapes, tubes) and cable jacketing for communication cables that are run through air plenums.

BACKGROUND OF INVENTION

Communication cables have evolved continuously over the years as we have evolved from a voice-based telecommunication network environment to the new structured cabling designs for high-speed data transmission which are commonly referred to as Local Area Networks or LAN's. Technical requirements, standards and guidelines of the Telecommunication Industry Association and Electronic Industry Association (TIA/EIA) and International Standard Organization (ISO) have been developed and published to support high-speed data communication of voice, internet and video. In addition, these requirements continue to evolve with more and more stringent electrical performance needs such that cellular foam insulation and fillers play an increasing role in the cable designs. The primary communications cable designs incorporate twisted copper pairs together to form a balanced transmission line, coaxial cables, and fiber optic cables. All of these cables may be run in a network of a building (LAN's) as separate functional cables or in hybrid or combination cable design.

Furthermore, TIA/EIA has defined standards that are published and recognized as well as industry drafts of soon-to-be published standards for commercial building telecommunication networks. Table 1, which follows, provides those published and pending, or soon-to-be adopted and published Technical Service Bulletin "TSB" standards.

TABLE 1

| TIA/EIA Standards | | |
|---|---|---|
| Category 5e ISO Class D | Frequency Bandwidth 1 to 100 mhz | ANSI/TIA/EIA-568-A Commercial Building Telecommunications Standard Part 2: Balanced Twisted Pair Cabling Component; 2001 |
| Category 6 ISO Class E | Frequency Bandwidth 1 to 250 mhz | ANSI/TIA/EIA-568-B.2-1 Commercial Building Telecommunications Standard Part 2: Addendum 1: Transmission Specification for 4 pair 100 ohm Category 6 Cabling; 2002 |
| Category 6A ISO Class $E_A$ | Frequency Bandwidth 1 to 500 mhz | ANSI/TIA/EIA-568-B.2-10 Commercial Building Telecommunications Standard Part 2: Addendum 10: Transmission Specification for 4 Pair 100 ohm Augmented Category 6 Cabling; TSB pending publication |
| Category 7 ISO Class F | Frequency Bandwidth 1 to 600 mhz | TIA not actively developing standard; ISO/EIA-11801, $2^{nd}$ Ed. Information Technology - Generic Cabling for Customer Premises, 2002 |

Each of the standards of Table 1 illustrate continued widened bandwidth enabling greater data transmission. The broadening of communication cable bandwidth enhances the electrical characteristics or data bit rate based on the evolving needs of software, hardware and video transmission. The terminology within the standards for testing can be defined as electrical performance within the cable as measured by impedance, near end and far end crosstalk (NEXT & FEXT), attenuation to crosstalk ratio (ACR), ELFEXT, ELNEXT, Power Sum, etc., and the electrical performance that may be transferred to the adjacent cable a.k.a. (alien cross talk) which are measured within similar performance parameters while incorporating a power sum alien cross talk requirement.

Electromagnetic noise that can occur in a cable that runs alongside one or more cables carrying data signals can create alien crosstalk. The term "alien" arises from the fact that this form of Crosstalk occurs between different cables in a group or bundle, rather than between individual wires or circuits within a single cable. Alien Crosstalk can be particularly troublesome because of its effect on adjacent 4 pair cables which degrades the performance of a communications system by reducing the signal-to-noise ratio.

Traditionally, alien crosstalk has been minimized or eliminated by aluminum Mylar$^R$ shields and/or braid in shielded cable designs i.e. (Category 7 or ISO Class F shielded designs) to prevent electromagnetic fields from ingress or egress from the cable or cables. The use of foamed or blown constructions for symmetrical and asymmetrical airspace designs further improve electrical performance characteristics in that the overall modulus and elasticity of the resulting foamable compounds are reduced leading to final conformations that more closely approach optimal geometries. Specifically, the ability to form inner structures of cables such that these inner structures have little or no plastic memory once the cabling process is completed, ensures that the nested pairs remain in the desired geometric configuration and that the use of foamed fillers, insulations and jackets using air as an insulator act to mitigate alien crosstalk in Unshielded Twisted Pair (UTP) designs i.e. (Category 6 or ISO Class E and Category 6 Augmented or ISO Class $E_A$).

Further developments have also recently embraced the cable fillers components, designed either to prevent cross-talk or alien cross-talk. As the TIA electrical requirements have moved from Augmented Cat. 6 to Augmented Cat. 6a, the electrical requirements also of the cable fillers materials are becoming more and more critical. Therefore the cable fillers are moving to perfluoropolymers such as FEP and TFE/perfluoroalkylvinylether copolymers to meet the attenuation requirements. As previously mentioned, the cable fillers' (like cross-webs') main function is to prevent cross-talk between the pairs.

More and more cables (for instance for data transmission between computers, voice communications, as well as control signal transmission for building security, fire alarm, and temperature control systems) are often installed in the air return space above the suspended ceiling without the use of metal conduits. Combustible materials (insulating or jacketing materials as well as fillers from cables) are thus accumulating in plenums in ever-increasing amounts.

While solutions for implementing physical foaming have been largely proposed in the past, this technology requires complex extrusion lines and accurate control of feeding of foaming agents. Standard equipments of LAN cables manufacturers cannot be efficiently retrofitted to produce foamed components by physical foaming. Intensive capital expenditure and increased operational costs are thus related to the implementation of physical foaming technologies. Moreover, fine cells are difficult to be obtained in foamed materials by physical foaming.

U.S. Pat. No. 6,064,008 discloses communication cables is provided having at least one elongate electrical conductor surrounded by a layer of insulating material, said layer including a chemically blown fluorinated polymer having a melting point of greater than about 480° F. The fluorinated polymer is preferably a high melting fluorinated polymer and is chemically blown by a blowing agent such as the barium salt of 5-phenyltetrazole. Nevertheless, this process requires the use of highly costly chemical blowing agent; also, due to the low thermal stability of the same, accurate control of processing is required for obtaining suitable foaming of the fluoropolymers having high melting point.

The designers of the first plenum cables used perfluoropolymers, the best available fire resistant and low smoke producing materials at the time. The first plenum cables listed had Fluorinated Ethylene Propylene (FEP) insulation and jackets, basically the same materials used today to meet the NFPA 262 or the limited combustible listing requirements of 25/50/8. Nevertheless, electrical performances of FEP are limited: even if bare FEP could be used, materials with improved electrical performance are desired to give more freedom with their design and give companies cables with a competitive advantage exceeding the minimum standards. Actually FEP bare or virgin material is hardly suitable for the manufacture of all parts of cables such as those for Gigabit Ethernet and future higher speed LAN applications, e.g. those complying with transmission requirements of ANSI/TIA/EIA 568-B.2, Addendum 1, Category 6 (so-called "category 6-cables"). Use of recycled FEP and other polymers for wire and cable and filler materials thereof can be utilized to improve properties and mitigate costs.

These Electrical Performance Standards especially for UTP cables (Category 5e, 6, 6A and 7) necessitate improved insulative performance wherein foamed perfluoropolymers optimize their inherently excellent insulative values i.e. (dielectric constant and dissipation factor.)

Foamed perfluoropolymers also offer lower cost and lower material content while improving fire retardancy performance by lowering the amount of combustible material in a cable and the overall fire load of Local Area Network cables within a building.

The Applicant has demonstrated that melt-processable per(halo)fluoropolymers, including FEP, PFA and MFA, can be compounded into pellets and subsequently chemically foamed via an extrusion process. The resulting foamed extrudate therefrom, in at least certain embodiments, would comply with the above-mentioned fire and smoke requirements and with sheathing requirements for next generation LAN cable.

A brief review of the Fire Performance Requirements both in North America and Globally follows:

In 1975, the National Fire Protection Agency (NFPA) recognized the potential flame and smoke hazards created by burning cables in plenum areas, and adopted within the United States, the National Electric Code (NEC), a standard for flame retardant and smoke suppressant cables. The National Electrical Code presently requires that such cables be either placed within a metal conduit or be insulated with materials that result in low flame and low smoke emission. This standard, commonly referred to as "the Plenum Cable Standard", was later adopted for North America Communications Cabling by Canada and Mexico. The standard permits the use of power-limited type cables that includes communication cables without conduit, so long as the cable exhibits low smoke and flame retardant characteristics.

The premise of the standard is based on the concerns that flame and smoke could travel along the extent of a building plenum area if the electrical conductors and cable were involved and were not flame and smoke resistant. The National Fire Protection Association ("NFPA") developed the standard to reduce the amount of flammable material incorporated into insulated electrical conductors and jacketed cables. Reducing the amount of flammable material would, according to the NFPA, diminish the potential of the insulating and jacket materials from spreading flames and evolving smoke to adjacent plenum areas and potentially to more distant and widespread areas within a building. The cellular foam fluoropolymer products of this disclosure can typically reduce the quantity of combustible materials by 30 to 60% based on the extent of the foaming process within insulations, fillers and jacket materials.

Nevertheless, all these designs require the development of improved fluoropolymer materials as cable fillers components having improved electrical properties, and still possessing adequate flammability properties. In order to meet the ever more stringent fire standards (NFPA 262 and/or "LC") and to achieve electrical performances for novel LAN structures (Cat. 6 or 6a), it would be useful to find alternative insulation solutions which can provide improved properties both for reducing cross-talk and smoke/flame generation, and which enable achievement of these targets with potential reduction in cost. It has been thus proposed to use perfluoromaterials under the form of foams, so as to effectively reduce the mass of potentially combustible material while maximizing insulation and shielding performances. Basically, foaming of a perfluoropolymer can be obtained by physical foaming, i.e. by introduction of a suitable foaming agent (i.e. an inert gas) in the extrusion line processing the material in the melt state, or by chemical foaming, ie. by extrusion of a composition comprising suitable precursors undergoing thermal decomposition at processing temperatures so as to in situ generate the foaming agent required to form the cellular structure.

The accumulation of combustible materials in air return plenum spaces has caught the attention of American associations like the National Building Code Community, the National Fire Protection Association (NFPA) and two key groups within the NFPA (the 90A Heating and Ventilating Group, and the 70 National Electrical Code Group) because cables can present a larger fire load than wall coverings or furniture. NFPA 262 standard prescribes the methodology to measure flame travel distance and optical density of smoke for insulated, jacketed, or both, electrical wires and cables and optical fiber cables that are to be installed in plenums and other spaces used to transport environmental air without being enclosed in raceways.

The test method for measuring these characteristics is commonly referred to as the Steiner Tunnel Test. The Steiner Tunnel Test has been adapted for the burning of cables according to the following test protocols: NFPA 262, Underwriters Laboratories (U.L.) 910, or Canadian Standards Association (CSA) FT-6. The test conditions for each of the U.L. 910 Steiner Tunnel Test, CSA FT-6, and NFPA 262 are as follows: a 300,000 BTU/hour flame is applied for 20 minutes to a calculated number of cable lengths based on their diameter that fills a horizontal tray approximately 25 feet long with an enclosed tunnel. This test simulates the horizontal areas (ceilings) in buildings wherein these cables are run.

The pass/fail criteria require the cables to possess in the standardized Steiner tunnel test an Average Optical Density (AOD) (i.e. smoke) of <0.15, a Peak Optical Density (POD) (i.e. smoke) of <0.5 and a Flame Propagation Distance (FPD) of 5<ft. Further, even more stringent requirements have been settled for plenum permanent building materials so as to comply with the "Limited Combustible—(LC) requirement. The pass/fail criteria for materials such as wallboard and ceiling tile, which are either used to manufacture these spaces or will be exposed to the air flow, is controlled by the NFPA-255 and 259 tests; it is thus required to a "Limited Combustible" (LC) material to pass the 25/50/8 test. i.e. having a Flame Spread Rating of <25, a Smoke Developed Index of <50 per NFPA-255 and a Potential Heat Value of <3,500 Btu/lb (equal to 8,141 kJ/kg) per NFPA-259.

In response to the request of safer cables, manufacturers have introduced a new plenum cable with higher fire safety characteristics. This new classification of cable is called "Limited Combustible Cable" and is identified by the listing mark "Limited Combustible FHC 25/50 CMP". To evaluate cable performances, it has appeared "logical" to apply the 25/50/8 requirements of LC materials for cables as tested per NFPA's 255 and 259. The primary difference between traditional combustible plenum cables and the limited combustible cable is that the latter is both insulated and jacketed with materials complying with the 25/50/8 requirements according to NFPA's 255 and 259.

Whichever is the fire safety characteristic which the plenum cables have to comply with (either NFPA 262 or "LC"), it is clear that a deep redesign of cable components, including materials for both primary insulation, cable fillers and jackets, has been found necessary.

The products of the present disclosure have alternatively been developed to support the possible adoption of a new NFPA standard referenced as NFPA 255 entitled "Limited Combustible Cables" with less than 50 as a maximum smoke index and NFPA 259 entitled "Heat of Combustion" which includes the use of an oxygen bomb calorimeter that allows for materials with less than 3,500 BTU/lb. for incorporation into cabling systems and buildings wherein survivability of the communication network from fires is required i.e. (military installation such as the Pentagon in Washington D.C.).

Table 2 provides a hierarchy of fire performance standards for North America and Europe.

TABLE 2

| Flammability Test Methods and Level of Severity for Wire and Cable | | | |
|---|---|---|---|
| Cable Type | Test Method | Ignition Source Output | Duration |
| Limited Combustible | UL2424/NFPA 259/255/UL723 | 8,141 KJ/kg (3,500 BTU/lb.) | 10 min |
| CMP | Steiner Tunnel UL 910/NFPA 262 | 88 kW (300k BTU/hr.) | 20 min. |
| CMR | RISER UL 1666/UL2424/NFPA 259 | 154 kW (527k BTU/hr.) | 30 min. |
| CPD Class D | Single Burning Item | 30 kW (102k BTU/hr.) | 30 min. (20 min burner) |
| CPD Class D | Modified IEC 60332-3 | 30 kW (102k BTU/hr.) (Backboard behind ladder (heat impact)) | 20 min. |
| CM | IEC 60332-3 | 20.5 kW (70k BTU/hr.) | 20 min. |
| CMX | Vertical Tray | 20.5 kW (70k BTU/hr.) | 20 min. |
| CMUC | IEC 60332-1/ULVW-1 | Bunsen Burner | 1 min. (15 sec. Flame) |

| Cable Fire Performance (Levels of Severity) | |
|---|---|
| NFPA 255 & NFPA 259/LC/CPD Class B1+/UL 2424 | (most stringent) |
| NFPA 262/EN 50289/FT-6/CPD Class B1/UL 910 | |
| UL 1666 Riser/FT-4/CPD Class C & B2 | |
| UL 1581 Tray/IEC 60332-3/FT-2/CPD Class D | |
| VW 1/IEC 60332-1/FT-1/CPD Class E | (least stringent) |

There is thus a strong need in the art to provide for alternative foamable perfluoropolymer compositions useful as cable components, which can be easily processed in the melt using conventional equipments, able to comply with the limited combustible requirements and which possess outstanding electrical properties, making it suitable for so-called-augmented category 6 or 6a-cables" to be used in Gigabit Ethernet and future higher speed LAN applications.

This disclosure relates to improved materials that can be used as wire insulation, cable fillers (e.g. crosswebs) and cable jacketing for communication cables which are run through air plenums without the use of a metal conduit and which notably conform to Telecommunication Industry Association (TIA), Underwriters Laboratories (UL) and National Electrical Code standards.

For these applications requiring survivability from flame spread and smoke generation, the cellular products of the present disclosure will be an effective method for reducing material content and the fuel load of cables in such critical environments.

SUMMARY OF THE INVENTION

In the present disclosure the term blowing agent(s) and foaming agent(s) are synonymous and may be used interchangeably. The term nucleating agent(s) are used in materials that provide sites for the formation of cells resulting from blowing agents or gas injection The present disclosure refers to talc as natural or synthetic hydrated magnesium silicate. It has been discovered that talc acts independently as a chemical blowing agent in combination with the perfluoropolymers and fluoropolymers of the present invention without the need for additional blowing agents or the need for any nucleating agent. In certain cases, the talc used to produce the fluorinated polymeric foamable products described may act as both a chemical blowing agent and a nucleating agent.

This disclosure provides a composition, method and system for producing foamed or blown cellular insulation articles utilizing fluorinated polymers (either perfluoropolymers or fluoropolymers) to create a lower cost communications cable, conductor separator, conductor support-separator, jacketing, tape, tube, crossweb, wrap, wire insulation and as well as a conduit tube for individual components or several combined configurations that exhibit improved electrical, flammability and optical properties.

The foamable perfluoropolymers disclosed yield the inherent benefits of reducing the amount of combustible materials within a cable as well as enhancing electrical properties while reducing costs. Blown, foamed or cellular perfluoropolymers or fluoropolymer insulating jacket or filler material using a nucleating/foaming agent of talc the chemical composition of which includes $MgSiOH$; $3MgO+4SiO_2+H_2O$; $MgOH+H_2O+SiOH$ or any derivative thereof that synergistically reacts with the perfluoropolymers at their elevated or higher extrusion operating temperatures with or without a chemical blowing agent or gas blowing agent are also a portion of the subject of this disclosure. The foaming agent properties of talc create a cellular foam ideally suited for the requirement of Category 6 and 6A UTP fillers i.e. (crosswebs, circular profiles, tubes and tapes) and is a highly cost effective replacement for the traditionally used Boron Nitride which costs approximately $60.00 per lb. versus the cost per lb. of talc of approximately $1.00 per lb.

The cost reduction benefit due to the change from Boron Nitride to talc is further enhanced by the fact that insulation, jacketing and filler extrusion may be performed by a relatively simplistic and robust chemical reaction that uses varying extrusion temperatures to foam at various desired percentages based on varying talc loadings. Noteworthy, under specific extrusion conditions which are described in further detail, talc itself "foams". Traditional foaming of perfluoropolymers has been via a gas injection extrusion process and the use of nucleated perfluoropolymers with Boron Nitride. The cost benefits of chemical foaming vis-à-vis gas foaming of perfluoropolymers enable standard high temperature extruders to run foam perfluoropolymers without the need to port the barrel with a highly sophisticated gas valve. The use of talc also works effectively with traditional gas injection extrusion processes.

An added benefit of using talc is that it neutralizes the acidity of hydrogen fluoride (HF) which may evolve during extrusion. HF is highly acidic and causes corrosion in extrusion barrels, screws and extrusion head, tools and dies. Traditional metals or non-Hasteloy or Inconel surfaces cannot be used to extrude perfluoropolymers under normal process conditions and the use of talc significantly reduces the acidity of the HF, thus mitigating corrosive wear on standard extrusion equipment.

The introduction of talc has the benefit of being an acid (HF) scavenger when compounded into pellets prior to extrusion and acts as both a nucleating as well as a foaming agent. Furthermore, when enhanced with the addition of a pelletized perfluoropolymer with $MgCO_3$ and $CaCO_3$ and AClyn® wax (a registered trademarked wax provided by Honeywell) perfluoropolymer foaming levels are further enhanced. This foaming agent of magnesium carbonate and calcium carbonate may be added as a separate pellet in a tumble blended mix or compounded together in a single homogenous pellet of talc ($MgSiOH$; $3MgO+4SiO_2+H_2O$; $MgOH+H_2O+SiOH$) and $MgCO_3/CaCO_3/$AClyn® wax. The single homogenous pellet can then be extruded for insulations, jackets, or fillers in a very simplistic chemically foamed extrusion process for perfluoropolymers. The foaming rate from 20% to 50% can be raised or lowered based on the percentage of each constituent used as well as by adjustments in extrusion temperatures.

The present disclosure also refers to talc as natural or synthetic hydrated magnesium silicate. It has been discovered that talc acts independently as a chemical blowing agent in combination with the perfluoropolymers and fluoropolymers of the present invention without the need for additional blowing agents or the need for any nucleating agent. In certain cases, the talc is used to produce the fluorinated polymeric foamable pellets from which foamed products may be obtained, where the pellets contain talc that acts as a chemical blowing agent and in some cases as a nucleating agent when the pellets are heated and extruded.

The family of perfluoropolymers wherein these compounded foaming and in some cases nucleating agents may be used are at least the following:

The perfluoropolymers that are characterized here are the melt processable materials for which this disclosure is focused:
1. FEP (Fluorinated Ethylene Propylene)
2. PFA (Perfluoroalkoxy)
3. MFA (Polytetrafluoroethylene-Perfluoromethylvinylether)

It should be emphasized that the use of talc may be independent of the use of $MgCO_3/CaCO_3/$AClyn® wax or talc may be used in any combination with $MgCO_3/CaCO_3/$AClyn® wax to produce the desired foamabled compositions.

The perfluoropolymers described are a subset of fluoropolymer resins that can be used and may include copolymers of TFE with one or more copolymerizable monomer chosen from perfluoroolefins having 3-8 carbon atoms and perfluoro (alkyl vinyl ethers) (PAVE) in which the linear or branched alkyl group contains 1-5 carbon atoms. Preferred perfluoropolymers include copolymers of TFE with at least one hexafluoropropylene (HFP) unit and one PAVE (unit). Preferred comonomers include PAVE in which the alkyl group contains 1-3 carbon atoms, especially 2-3 carbon atoms, i.e. perfluoro (ethyl vinyl ether) (PEVE) and perfluoro (propyl vinyl ether) (PPVE). Additional fluoropolymers that can be used include copolymers of ethylene with TFE, optionally including minor amounts of one or more modifying comonomer such as perfluorobutyl ethylene. Representative fluoropolymers are described, for example, in ASTM Standard Specifications D-2116, D-3159, and D-3307. Such fluoropolymers are non-functional fluoropolymers if they have essentially no functional groups, but are functionalized fluoropolymers if functional groups are added, e.g., by grafting. Alternatively or additionally, preferred fluoropolymers are non-elastomeric, as opposed to elastomeric.

Functionalized fluoropolymers include fluoropolymers such as those described in the foregoing paragraph and additionally containing copolymerized units derived from functional monomers. If the concentration of functional monomer is high enough in a TFE copolymer, however, no other comonomer may be needed. Usually, but not necessarily, the functional groups introduced by such monomers are at the ends of pendant side groups. Functional monomers that introduce pendant side groups having such functionality can have the general formula CYZ wherein Y is H or F and Z contains a functional group. Preferably, each Y is F and —Z is —Rf—X, wherein Rf is a fluorinated diradical and X is a functional group that may contain $CH_2$ groups. Preferably, Rf is a linear or branched perfluoroalkoxy having 2-20 carbon atoms, so that the functional comonomer is a fluorinated vinyl ether. Examples of such fluorovinylethers include $CF_2$ CF[$OCF_2$CF($CF_3$)]m-O—($CF_2$)n $CH_2$OH as disclosed in U.S. Pat. No. 4,982,009 and the alcoholic ester $CF_2$—CF[$OCF_2$CF($CF_3$)]m-O—($CF_2$)n—($CH_2$)p-O—COR as disclosed in U.S. Pat. No. 5,310,838. Additional fluorovinylethers include $CF_2$CF[$OCF_2$CF($CF_3$)]m O($CF_2$)n COOH and its carboxylic ester $CF_2$CF[$OCF_2$CF($CF_3$)]m O($CF_2$)n COOR disclosed in U.S. Pat. No. 4,138,426. In these formulae, m=0-3, n=1-4, p=1-2 and R is methyl or ethyl. Preferred fluorovinylethers include $CF_2$CF—O—$CF_2$$CF_2$—$SO_2$F; $CF_2$CF[$OCF_2$CF($CF_3$)]O($CF_2$)$_2$—Y wherein —Y is —$SO_2$F, —CN, or —COOH; and $CF_2$.CF[$OCF_2$CF($CF_3$)]O($CF_2$)$_2$—$CH_2$—Z wherein —Z is —OH, —OCN, —O—(CO)—$NH_2$, or —OP(O)(OH)$_2$. These fluorovinylethers are preferred because of their ability to incorporate into the polymer backbone and their ability to incorporate functionality into the resultant copolymer.

One embodiment is the use of talc at about 7% by weight combined with about 93% neat resin.

One embodiment is that foaming will occur with the use of talc at 10% by weight with 90% neat resin.

Pellets of the compounds described above can be created at 600-610 Deg F. and as low as 570 F within the extruder barrel.

One embodiment of the present application includes a first composition comprising a blend of perfluoropolymer such as, MFA (polytetrafluoroethylene-perfluoromethylvinylether) $MgCO_3$, $CaCO_3$, and AClyn® wax as a powder blend homogeneously mixed; a second composition, wherein the blowing or foaming agent is comprised of the first composition plus a perfluoropolymer that is melted, blended and extruded to provide a pelletized master batch; a third composition which is a nucleating/foaming agent comprising perfluoropolymer plus talc or other talc derivative (which may include $Mg_3Si_4O_{10}(OH)_2$) which is blended, melted and extruded into a pelletized form; and a fourth composition may or may not comprise the second composition (foaming agent) and the third composition (nucleating/foaming agent) tumble blended into a homogenous pelletized form of the second and third compositions for extrusion that allows for blowing or foaming with or without gas injection and with or without another chemical foaming agent. Furthermore, the second composition may be compounded with the third composition along with a perfluoropolymer that is melted into a single pellet enabling a simple and straight forward single step chemically foamable perfluoropolymers.

It should be noted that AClyn® wax is only one of several waxes that can be used as a processing aid and that other processing aids exist which provide similar or better processing conditions.

A specific embodiment includes mixtures by weight of the first composition comprising a blend of perfluoropolymer (94.8%), $MgCO_3$ (3.79%), $CaCO_3$ (0.94%), and AClyn® wax (0.47%) as a powder blend mixed homogeneously; a second composition that is the blowing or foaming agent comprised of the first composition (20%) and a perfluoropolymer (80%) which is heated to a selected melting point, blended and extruded to provide a pelletized master batch; a third composition which is a nucleating/foaming agent comprising perfluoropolymer pellets (85%) and talc (15%) which is compounded together via heating to a selected melting point and extruded into a pelletized form; and a fourth composition comprising the second composition (blowing or foaming agent—30%) and the third composition (nucleating/foaming agent—70%) tumble blended in pelletized form for subsequent extrusion such that the pellets are placed in an extruder, heated to a selected melting point allowing for manufacture of blown or foamed insulative components. The third composition may be used exclusively as a nucleating and foam agent in a tumbled blend of 30% nucleating foam agent and 70% perfluoropolymer pellets.

Another embodiment includes a first composition of a specific perfluoropolymer and third composition comprising a different perfluoropolymer.

An additional embodiment includes blending the second composition in a ratio range of 1% to 99% and the third composition in a ratio range of 1% to 99% by weight to create the fourth composition.

An additional embodiment includes the third composition comprising a singular perfluoropolymer or a mixture of different perfluoropolymers or recycled perfluoropolymers wherein the recycled perfluoropolymers comprise from 1-100% of the perfluoropolymers.

A further embodiment also includes the optional addition of organic or inorganic salts to the third composition or to the fourth composition together with or in lieu of the use of talc.

In another embodiment of the third composition, additional nucleating agent may be used in combination with the talc in an amount from 1% to 10% by weight.

In another embodiment the third composition comprises talc in an amount from 2%-20% by weight.

In another embodiment the fourth composition comprises inorganic or organic salt(s) together with a perfluoropolymer.

Another embodiment includes the talc of the third composition, during blowing or foaming, reacting synergistically with the aforementioned fourth composition to form smaller, more uniform cell structures in the foamed or blown fourth composition.

Additionally an embodiment is where the third composition comprises 100% non-recycled talc powder combined with 100% non-recycled perfluoropolymer wherein the ratio of talc to perfluoropolymer is 0.5%-20% by weight.

In another embodiment the talc and/or the perfluoropolymer may be recycled or virgin.

An embodiment including the perfluoropolymer of the fourth composition comprises a fluoropolymer or a perfluoropolymer such as MFA (polytetrafluoroethylene-perfluoromethylvinylether), FEP (fluoronated ethylene propylene), or PFA (Perfluoroalkoxy) as a singular perfluoropolymer formulation or as a mixture of one or more perfluoropolymer formulations.

Another embodiment includes the extruded fourth composition comprising a foamed or blown cell structure wherein the cell structures are consistent and as small as 0.0005 inches to 0.003 inches with an average size of 0.0008 inches.

In another embodiment the third composition comprises talc in an amount from 0.5%-20% by weight.

In another embodiment the third composition comprises inorganic or organic salt(s) and a perfluoropolymer.

Another embodiment includes the talc of the third composition, during blowing or foaming, reacting synergistically with the fourth composition to form smaller, more uniform cell structures in the foamed or blown fourth composition.

An embodiment includes blending the fourth composition comprising a second composition (35%), a third composition (30%) and selected non-recycled perfluoropolymer (35%) in pelletized form and tumble blended.

In another embodiment the cellular insulation is 100% recyclable.

Another embodiment is that the fourth composition may comprise either inorganic or organic additives or both that include inorganic salts, metallic oxides, silica and silicon oxides as well as substituted and unsubstituted fullerenes.

Also in an embodiment the fourth composition is capable of meeting specific flammability and smoke generation requirements as defined by UL 910, UL 2424, NFPA[[APA]] 262, 259, 255, and EN 50266-2-x, class B test specifications.

Another embodiment includes the use of a twin-screw extruder for melting, blending and pelletizing the second composition and third composition. In more detail, the compounding process utilizes a two-step system to insure the foaming components are thoroughly distributed and dispersed in the base polymer of the final compound. The first step requires a masterbatch blend be made of the foaming agents. The foaming agents are in a fine powder form and a high intensity blender, (i.e. Henschel type) is used to prepare the powder blend according to the specified formulation. A certain amount of resin, also in powder form, can be used in the first blending step as a mechanism to predisperse the foaming agents and aid in the second extrusion compounding step. The second stage of the compound preparation process utilizes a twin screw extrusion compounding system to incorporate the foaming agent masterbatch blend with the base resin. The design of the compounding screw is such that there is sufficient heat and mechanical energy to fully thermally melt the base polymer and incorporate the masterbatch blend with proper distribution and dispersion during mixing for homogeneity, but yet mild enough to keep the processing temperature of the compound below that in which foaming may be prematurely initiated. The final compound can be strand extruded and pelletized or alternatively an underwater pelletizing technique may be used (in other words air or water cooling is acceptable).

Another embodiment is a method and system for blowing or foaming the fourth composition to encapsulate metallic conductive media as an insulative coating to improve electrical performance, reduce combustibility and reduce costs over present methods.

Another embodiment is a method and system for blowing or foaming the fourth composition by extrusion through one or more dies to manufacture cable support-separators, conduit tubes, jackets, tapes or wraps.

Another embodiment is a method and system for heating the powder of the first composition and a selected pelletized perfluoropolymer or fluoropolymer thereby creating a melt blendable second composition, extruding the molten second composition, cooling the molten second composition and forming the solid second composition into a pelletized foaming agent.

Another embodiment is a method and system for heating the talc powder and a selected pelletized perfluoropolymer or fluoropolymer creating a melt blendable third composition, extruding the molten third composition, cooling the molten third composition and forming the solid third composition into a pelletized nucleating and foaming agent.

Another embodiment is a method and system for tumble blending the pelletized foaming agent of the second composition and the pelletized nucleating agent of the third composition creating a fourth composition that may extruded or otherwise heated such that a foamed or blown extrusion profile is formed.

One embodiment involves a system and method for producing a high performance multi-media cable including a plurality of transmission media with metal and/or optical conductors that are individually insulated, where the insulation is comprised of blowing or foaming the fourth composition and wherein the composition is provided for as individual conductors as twisted pair and may be isolated by a cable support-separator that is foamed or blown through a die utilizing the same composition. The separator may be optionally wrapped, taped or have an outer jacket of a blown or foamed with the same fourth composition while maintaining the plurality of data transmission media in a proper position with respect to the core.

Another embodiment includes the use of a twin-screw extruder for melting, blending and pelletizing the composition. In more detail, the compounding process utilizes a two-step system to insure the foaming components are thoroughly distributed and dispersed in the base polymer of the final compound. The first step requires a masterbatch blend be made of the foaming agents. The foaming agents are in a fine powder form and a high intensity blender, (i.e. Henschel type) is used to prepare the powder blend according to the specified formulation. A certain amount of resin, also in powder form, can be used in the first blending step as a mechanism to predisperse the foaming agents and aid in the second extrusion compounding step. The second stage of the compound preparation process utilizes a twin screw extrusion compounding system to incorporate the foaming agent masterbatch blend with the base resin. The design of the compounding screw is such that there is sufficient heat and mechanical energy to fully thermally melt the base polymer and incorporate the masterbatch blend with proper distribution and dispersion during mixing for homogeneity, but yet mild enough to keep the processing temperature of the compound below that in which foaming may be prematurely initiated. The final compound can be strand extruded and pelletized or alternatively an underwater pelletizing technique may be used (in other words air or water cooling is acceptable).

Another embodiment is a method and system for heating the talc powder and a selected pelletized perfluoropolymer or fluoropolymer creating a melt blendable composition, extruding the molten composition, cooling the molten composition and forming the solid composition into a pelletized nucleating and foaming agent.

Another embodiment includes a communications cable, conductor separator, conductor support-separator, jacketing, tape, wrap, wire insulation and in some cases a conduit tube individually comprising the same blown or foamed fourth composition or may utilize the fourth composition that includes selected perfluoropolymers or fluoropolymers.

Additionally disclosed is a composition of MFA powder, calcium carbonate, magnesium carbonate and AClyn® wax as a second composition and MFA, FEP or PFA (in pellet or powdered form) and talc as a third composition wherein the second composition and the third composition are combined in a ratio of thirty percent and seventy percent respectively, tumble blended and provide for a blowing agent to form a foamed or blown insulation.

Additionally disclosed is a composition of FEP powder, calcium carbonate, magnesium carbonate and AClyn® wax as a second composition and FEP, MFA or PFA and talc as a third composition wherein the second composition and the third composition are combined in a ratio of thirty percent and seventy percent respectively, tumble blended and provide for a blowing agent to form a foamed or blown insulation.

Additionally disclosed is a composition of PFA powder, calcium carbonate, magnesium carbonate and AClyn® wax as a second composition and PFA, MFA or FEP (in pellet or powdered form) and talc as a third composition wherein the second composition and the third composition are combined in a ratio of thirty percent and seventy percent respectively, tumble blended and provide for a blowing agent to form a foamed or blown insulation.

Another embodiment of the disclosure includes the use of a foamed core and/or the use of a hollow center of the core, which in both cases significantly reduces the material required along the length of the finished cable. The effect of foaming and/or producing a support-separator with a hollow center portion should result in improved flammability of the overall cable by reducing the amount of material available as fuel for the UL 910 test, improved electrical properties for the individual non-optical conductors, and reduction of weight of the overall cable.

A method and system wherein the blown and/or foamed perfluoropolymer composition cable, support-separator, conduit tube, jacketing, wrapping and/or taping line speeds are at or about 75 to 1500 ft/min.

Additional benefits of the embodiments include reduction of the overall material mass required for conventional spacers, insulation and jacketing which contributes to flame and smoke reduction.

Another embodiment of the disclosure includes the use this foam process, either chemical or gas, and placing foam skin with both being the same materials e.g. (Perfluoropolymers) in a coextrusion or a second extrusion of a thermoplastic non-fluoropolymer as a skin or encapsulated by a layer of foam or solid perfluoropolymer skin as an insulation, cable filler or jacket.

Additionally, a cellular foaming extrusion process wherein a perfluoropolymer or non-fluorinated polymer skin is formed over cellular foam during the extrusion process and where the process is performed using a single or dual head extruder such that the cellular foam is formed by either chemical or gas injection means is another object of the disclosure.

This disclosure also provides for an extrusion process where extrusion of a composition capable of forming cellular foam is extruded in an extruder using an extruder that is specifically designed to minimize mechanical shear and increased heating. This allows for mitigating premature foaming during the process of melting, blending, extruding and pelletizing of the desired compositions.

The desired perfluoropolymer compositions include adding into an extruded melt of a base perfluoropolymer resin, in sequential steps, sufficient talc to accomplish a loading of talc in a range of 0.5 to 20% in combination with perfluoropolymer resin for forming compound pellets such that the compositions may be used for subsequent heat extrusion or molding processes and provide cellular or foamed or blown perfluoropolymer end products.

The perfluoropolymer compositions may also be used to make extruded or molded desired shapes and geometries without palletizing and in so doing, talc is acting as a nucleating agent, a foaming agent or both during extrusion or molding.

It is thus an object of the present disclosure to provide a foamable perfluoropolymer composition having:
  at least one melt-processable per(halo)fluoropolymer [polymer (A)]; and a blowing agent having an effective amount of magnesium carbonate; and
  an active nucleating agent chosen among:
at least one metal carbonate different from magnesium carbonate having decomposition temperature exceeding 350° C., generally chosen among $CaCO_3$, $BaCO_3$, $ZnCO_3$ and $PbCO_3$; at least one natural or synthetic talc derivative including hydrated magnesium silicate; and mixtures thereof.

The composition of the disclosure can be chemically foamed yielding homogeneous foamed insulating structures which excel simultaneously in providing excellent insulating properties on metal wires or optical fibers, outstanding processing parameters for high speed cable manufacture and high performance ratings on flammability, smoke generation and fuel load.

The Applicant has surprisingly found that the above mentioned combination of a magnesium carbonate as blowing agent and an active nucleating agent as above described, enables obtaining per(halo)fluoropolymer chemically foamed structures in traditional wire extrusion/cable processing machines, thus enabling decreasing the final amount of material in the cable design (with significant cost and flammability advantages)

In an embodiment of the present disclosure it has been found that talc, generally known as a nucleating agent in foamed plastics, exhibits blowing agent properties without the presence of a blowing agent.

Another embodiment combines talc, as a blowing agent, with resin(s) in the absence of any additional chemical blowing agent wherein the talc comprises 2-50% by weight of the resin and wherein the resulting composition is extruded into an extrudate product.

In another embodiment the talc is combined with a resin as a masterbatch in a percentage of up to 15% talc by weight to resin and extruded as a pellet.

In another embodiment the talc is combined with a recycled resin as a masterbatch in a percentage of up to 20% talc by weight to recycled resin and extruded as a pellet.

In another embodiment the resin(s) may be perfluoropolymers as a subset of fluoropolymers FEP, MFA, PFA perfluotopolymers or semicrystalline fluoploymers ECTFE, ETFE, PVDF, etc. as pure resin, recycled resin, as a single resin or in combination with other resins.

In yet another embodiment the extrudate is a pellet, cross web, insulation, jacketing, wire insulation.

In another embodiment the extrudate is at a sufficiently low temperature so that the resin(s) are thermally constrained from foaming and subsequently extruded into pellet, jackets, separators, insulation, etc.

In another embodiment the pellets are extruded at a sufficiently high temperature so that the resin is receptive to the talc blowing agent wherein the product is a foamed article.

In another embodiment the pellets may optionally include and a color concentrate.

Another object of the disclosure is a foamed insulation comprising said composition.

Still an object of the invention is a process for manufacturing the composition.

Still another object of the disclosure is a process for manufacturing foamed insulation from the composition.

Other objects of the disclosure include recycled or waste materials to form these compositions (pelletized or otherwise), which can be processed and tumble blended with or without virgin or bare perfluoropolymer or fluoropolymers to obtain acceptable foamable compositions after heating and extrusion.

In another embodiment the resin(s) may be perfluoropolymers as a subset of fluoropolymers FEP, MFA, ECTFE, etc. as pure resin, recycled resin, as a single resin or in combination with other resins.

In yet another embodiment the extrudate is a pellet, cross web, insulation, jacketing, wire insulation.

Another object of the disclosure is a foamed insulation comprising said composition.

Still an object of the invention is a process for manufacturing the composition.

Still another object of the disclosure is a process for manufacturing foamed insulation from the composition.

Other objects of the disclosure include recycled or waste materials to form these compositions, which can be processed and tumble blended with or without virgin or bare per(halo)fluoropolymer to obtain acceptable foamable compositions.

Additionally it is known that foamed or blown articles or foamed composition produced with a gas blowing agent can be used in combination with talc leading to an increase in the percentage of cellular structure within a foamed or foamable composition when the combination of talc and either a chemical or gas blowing agent is used.

The disclosure includes and defines a cable utilizing the compositions described above.

DETAILED DESCRIPTION OF THE INVENTION

For the purpose of the present invention, the expressions "fluoropolymer" and "polymer (A)" are intended to denote any polymer comprising recurring units (R), more than 25 wt % of said recurring units (R) being derived from at least one ethylenically unsaturated monomer comprising at least one fluorine atom (hereinafter, fluorinated monomer).

The fluoropolymer comprises preferably more than 30% wt, more preferably more than 40% wt of recurring units derived from the fluorinated monomer.

The fluorinated monomer can further comprise one or more other halogen atoms (Cl, Br, I). If the fluorinated monomer is free of hydrogen atom, it is designated as per(halo)fluoromonomer. Shall the fluorinated monomer comprise at least one hydrogen atom, it is designated as hydrogen-containing fluorinated monomer.

Non-limitative examples of fluorinated monomers are notably tetrafluoroethylene (TFE), vinylidene fluoride (VdF), chlorotrifluoroethylene (CTFE), and mixtures thereof. Optionally, the fluoropolymer may comprise recurring units derived one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non-limitative examples of suitable fluorinated comonomers (FCM) are notably:

$C_3$-$C_8$ fluoro- and/or perfluoroolefins, such as hexafluoropropene, pentafluoropropylene, and hexafluoroisobutylene;

$C_2$-$C_8$ hydrogenated monofluoroolefins, such as vinyl fluoride;

1,2-difluoroethylene, vinylidene fluoride and trifluoroethylene; perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per) fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;

fluorodioxoles, of formula:

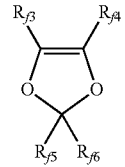

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

In a first embodiment of the invention, the polymer (A) is a hydrogen-containing fluoropolymer.

By "hydrogen-containing fluoropolymer" it is meant a fluoropolymer as above defined comprising recurring units derived from at least one hydrogen-containing monomer. The hydrogen-containing monomer may be the same monomer as the fluorinated monomer or can be a different monomer.

Thus, this definition encompasses notably copolymers of one or more per(halo)fluoromonomer (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers.

The hydrogen-containing fluoropolymers are preferably chosen among:

(A-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. No. 3,624,250 and U.S. Pat. No. 4,513,129);

(A-2) Vinylidene fluoride (VdF) polymers, optionally comprising reduced amounts, generally comprised between 0.1 and 15% by moles, of one or more fluorinated comonomer(s) (see for instance U.S. Pat. No. 4,524,194 and U.S. Pat. No. 4,739,024), and optionally further comprising one or more hydrogenated comonomer(s); and mixtures thereof.

According to a second preferred embodiment of the invention; the polymer (A) is a per(halo)fluoropolymer.

For the purpose of the invention, the term "per(halo)fluoropolymer" is intended to denote a fluoropolymer substantially free of hydrogen atoms.

The term "substantially free of hydrogen atom" is understood to mean that the per(halo)fluoropolymer consists essentially of recurring units derived from ethylenically unsaturated monomers comprising at least one fluorine atom and free of hydrogen atoms [per(halo)fluoromonomer) (PFM)].

The per(halo)fluoropolymer can comprise recurring units comprising one or more other halogen atoms (Cl, Br, I).

The per(halo)fluoropolymer can be a homopolymer of a per(halo)fluoromonomer (PFM) or a copolymer comprising recurring units derived from more than one per(halo)fluoromonomer (PFM).

Non limitative examples of suitable per(halo)fluoromonomers (PFM) are notably:

$C_2$-$C_8$ perfluoroolefins, such as tetrafluoroethylene (TFE) and hexafluoropropene (HFP);

chloro- and/or bromo- and/or iodo-$C_2$-$C_6$ per(halo)fluoroolefins, like chlorotrifluoroethylene;

per(halo)fluoroalkylvinylethers complying with general formula $CF_2=CFOR_{f3}$ in which $R_{f3}$ is a $C_1$-$C_6$ per(halo)fluoroalkyl, such as $-CF_3$, $-C_2F_5$, $-C_3F_7$;

per(halo)fluoro-oxyalkylvinylethers complying with general formula $CF_2=CFOX_{01}$, in which $X_{01}$ is a $C_1$-$C_{12}$ per(halo)fluorooxyalkyl having one or more ether groups, like perfluoro-2-propoxy-propyl group;

per(halo)fluoro-methoxy-alkylvinylethers complying with general formula $CF_2=CFOCF_2OR_{f4}$ in which $R_{f4}$ is a $C_1$-$C_6$ per(halo)fluoroalkyl, such as $-CF_3$, $-C_2F_5$, $-C_3F_7$ or a $C_1$-$C_6$ per(halo)fluorooxyalkyl having one or more ether groups, such as $-C_2F_5-O-CF_3$;

per(halo)fluorodioxoles of formula:

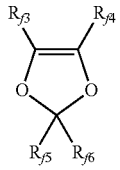

wherein each of $R_{f3}$, $R_{f4}$, $R_{f5}$, $R_{f6}$, are equal or different than each other, is independently a fluorine atom, a $C_1$-$C_6$ perfluoroalkyl group, optionally comprising one or more oxygen atoms, e.g. $-CF_3$, $-C_2F_5$, $-C_3F_7$, $-OCF_3$, $-OCF_2CF_2OCF_3$; preferably a per(halo)fluorodioxole complying with formula here above, wherein $R_{f3}$ and $R_{f4}$ are fluorine atoms and $R_{f5}$ and $R_{f6}$ are perfluoromethyl groups ($-CF_3$) [perfluoro-2,2-dimethyl-1,3-dioxole (PDD)], or a per(halo)fluorodioxole complying with formula here above, wherein $R_{f3}$, $R_{f5}$ and $R_{f6}$ are fluorine atoms and $R_{f4}$ is a perfluoromethoxy group ($-OCF_3$) [2,2,4-trifluoro-5-trifluoromethoxy-1,3-dioxole or perfluoromethoxydioxole (MDO)].

The per(halo)fluoropolymer is advantageously chosen among homopolymers of tetrafluoroethylene (TFE) or copolymers of TFE with at least one per(halo)fluoromonomer (PFM).

Preferred per(halo)fluoropolymer is selected among TFE homo- and copolymers comprising recurring units derived from at least one per(halo)fluoromonomer (PFM) chosen among the group consisting of:

perfluoroalkylvinylethers complying with formula $CF_2=CFOR_f$, in which $R_f$ is a $C_1$-$C_6$ perfluoroalkyl, e.g. $-CF_3$, $-C_2F_5$, $-C_3F_7$; and/or per(halo)fluorodioxoles of formula:

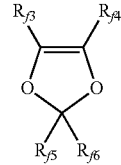

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. $-CF_3$, $-C_2F_5$, $-C_3F_7$, $-OCF_3$, $-OCF_2CF_2OCF_3$.

More preferred per(halo)fluoropolymers are selected among TFE homo- and copolymers comprising recurring units derived from at least one fluorinated comonomer chosen among the group consisting of:

perfluoroalkylvinylethers complying with formula $CF_2=CFOR_f$, in which $R_f$ is a group chosen among $-CF_3$, $-C_2F_5$, $-C_3F_7$; and/or per(halo)fluorodioxoles of formula:

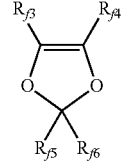

wherein $R_{f3}$ and $R_{f4}$ are fluorine atoms and $R_{f5}$ and $R_{f6}$ are perfluoromethyl groups ($-CF_3$) [perfluoro-2,2-dimethyl-1,3-dioxole (PDD)], or wherein $R_{f3}$, $R_{f5}$ and $R_{f6}$ are fluorine atoms and $R_{f4}$ is a perfluoromethoxy group ($-OCF_3$) [2,2,4-trifluoro-5-trifluoromethoxy-1,3-dioxole or perfluoromethoxydioxole (MDO)].

The per(halo)fluoromonomer (PFM) is present in the TFE copolymer in an amount of advantageously at least 0.01, preferably 0.1% by moles, with respect to the total moles of TFE and per(halo)fluoromonomer (PFM).

The per(halo)fluoromonomer (PFM) is present in the TFE copolymer in an amount of advantageously at most 3% by moles, preferably 1% by moles, with respect to the total moles of TFE and per(halo)fluoromonomer (PFM).

Good results have been obtained with TFE homo- and copolymers wherein the fluorinated comonomer is one or more than one perfluoroalkylvinylether as above specified; particularly good results have been achieved with TFE copolymers wherein the fluorinated comonomer is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

Best results have been obtained with TFE homo- and copolymers wherein the fluorinated comonomer is perfluoromethylvinylether, a mixture of perfluoromethylvinylether and perfluoropropylvinylether, a mixture of perfluoroethylvinylether and perfluoropropylvinylether, or perfluoropropylvinylether.

According to a first embodiment of the invention, polymer (A) is chosen among TFE copolymers comprising recurring units derived from HFP and optionally from at least one perfluoroalkylvinylether, as above defined.

Preferred polymers (A) according to this embodiment are selected among TFE copolymers comprising (preferably consisting essentially of) recurring units derived from tetrafluoroethylene (TFE) and hexafluoropropylene (HFP) in an amount ranging from 3 to 15 wt % and, optionally, from 0.5 to 3 wt % of at least one perfluoroalkylvinylether, as above defined.

A description of such polymers (A) can be found notably in U.S. Pat. No. 4,029,868, in U.S. Pat. No. 5,677,404, in U.S. Pat. No. 5,703,185, and in U.S. Pat. No. 5,688,885.

Polymer (A) according to this embodiment are commercially available under the trademark TEFLON® FEP 9494, 6100 and 5100 from E.I. DuPont de Nemours, or from Daikin (e.g. FEP NP-101 material), or from Dyneon LLC (FEP 6322).

Best results have been obtained with TFE copolymers comprising (preferably consisting essentially of) recurring units derived from tetrafluoroethylene (TFE) and hexafluoropropylene (HFP) in an amount ranging from 4 to 12 wt % and either perfluoro(ethyl vinyl ether) or perfluoro(propyl vinyl ether) in an amount from 0.5 to 3% wt.

According to a second embodiment of the invention, the polymer (A) is chosen among TFE copolymers comprising recurring units derived from at least one perfluoroalkylvinylether, as above defined.

Good results within this second embodiment have been obtained with TFE copolymers wherein the fluorinated comonomer is one or more than one perfluoroalkylvinylether as above specified; particularly good results have been achieved with TFE copolymers wherein the fluorinated comonomer is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

Best results within this second embodiment have been obtained with TFE homo- and copolymers wherein the fluorinated comonomer is perfluoromethylvinylether, a mixture of perfluoromethylvinylether and perfluoropropylvinylether, a mixture of perfluoroethylvinylether and perfluoropropylvinylether, or perfluoropropylvinylether.

According to a preferred variant of the second embodiment of the invention, the polymer (A) is advantageously a TFE copolymer consisting of:

(a) from 7 to 13% by weight of recurring units derived from perfluoromethylvinylether;

(b) from 0 to 3% by weight of recurring units derived from one or more than one fluorinated comonomer different from perfluoromethylvinylether and selected from the group consisting of perfluoroalkylvinylethers, as above detailed and/or perfluoro-oxyalkylvinylethers, as above detailed; preferably derived from perfluoroethylvinylether and/or perfluoropropylvinylether;

(c) recurring units derived from tetrafluoroethylene, in such an amount that the sum of the percentages of the recurring units (a), (b) and (c) is equal to 100% by weight.

MFA and PFA suitable to be used for the composition of the invention and are commercially available from Solvay Solexis Inc. under the trade name of HYFLON® MFA and PFA.

For the purpose of the present invention, by the term "melt-processable" is meant that the polymer (A) can be processed (i.e. fabricated into shaped articles such as cross-webs (x-webs), insulation(s), jacket coatings, films, fibers, tubes, wire coatings and the like) by conventional melt extruding, injecting or casting means. This generally requires that the melt viscosity at the processing temperature be no more than $10^6$ Pa-sec, preferably from 10 to $10^6$ Pa-sec.

Thus, polymer (A) is distinguishable from "non melt-processable" fluoropolymers, like notably PTFE, which cannot be processed by conventional melt extruding, injecting or casting means, and which generally exhibit a melt viscosity at the processing temperature exceeding $10^6$ Pa-sec.

The melt viscosity of the polymer (A) can be measured according to ASTM D-1238-52T, using a cylinder, orifice and piston tip made of a corrosion-resistant alloy, charging a 5.0 g sample to the 9.5 mm inside diameter cylinder which is maintained at a temperature exceeding melting point, extruding the sample 5 minutes after charging through a 2.10 mm diameter, 8.00 mm long square-edged orifice under a load (piston plus weight) of 5 kg. Melt viscosity is calculated in Pa-sec from the observable extrusion rate in grams per minute.

Also, polymer (A) typically has a dynamic viscosity at a shear rate of 1 sec$^{-1}$ and at a temperature exceeding melting point of about 30° C., preferably at a temperature of Tm2+ (30±2° C.) is comprised between 10 and $10^6$ Pa-sec, when measured with a controlled strain rheometer, employing an actuator to apply a deforming strain to the sample and a separate transducer to measure the resultant stress developed within the sample, and using the parallel plate fixture.

The polymer (A) typically has a dynamic viscosity at a shear rate of 1 sec.$^{-1}$ in the above specified conditions preferably comprised between 20 and 2000 Pa-sec, more preferably between 70 and 700 Pa-sec.

The polymer (A) of the invention is advantageously thermoplastic.

The term "thermoplastic" is understood to mean, for the purposes of the present invention, polymers existing, at room temperature (25° C.), below their melting point if they are semi-crystalline, or below their Tg if amorphous. These polymers have the property of becoming soft when they are heated and of becoming rigid again when hey are cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Polymer resins serving as a base constituent for obtaining true elastomers are in general amorphous products having a glass transition temperature (Tg) below room temperature (25° C.). In most cases, these products correspond to copolymers having a Tg below 0° C. and including reactive functional groups (optionally in the presence of additives) allowing the true elastomer to be formed.

Preferably, the polymer (A) is semi-crystalline.

The term "semi-crystalline" is intended to denote a polymer having a heat of fusion of more than 1 J/g when measured by Differential Scanning calorimetry (DSC) at a heating rate of 10° C./min, according to ASTM D 3418.

Preferably, the semi-crystalline polymer (A) of the invention has a heat of fusion of at least 3 J/g, more preferably of at least 5 J/g, most preferably at least 10 J/g.

According to a first embodiment of the invention, the per(halo)fluoropolymer (A) possesses a dielectric constant of advantageously at most 3.1, preferably at most 2.85, most preferably at most 2.6.

Compositions according to the first embodiment of the invention are particularly suitable for cable jacketing.

According to a second embodiment of the invention, the per(halo)fluoropolymer (A) possesses a dielectric constant of advantageously at most 2.4, preferably at most 2.3, most preferably at most 2.2. Excellent results have been obtained with per(halo)fluoropolymers having dielectric constant from about 2.0 to about 2.1.

Compositions according to the second embodiment of the invention are particularly suitable for primary insulation of cable conductors and cable fillers.

It is also understood that the foamable composition, once foamed so as to obtain a cellular structure, will generally possess a significantly lower dielectric constant, ranging from 1.5 to 2.0, preferably from 1.6 to 1.8, as a function of void fraction.

The blowing agent of the present invention optionally includes magnesium carbonate (MgCO3); it is well known that magnesium carbonate generally undergoes decomposition below 350° C., thus typically at temperatures of processing of the polymer (A).

Preferably up to 15 parts by weight of $MgCO_3$ per 100 parts by weight of polymer (A) can be used. More preferably, there are about 0.5 to about 10 parts by weight of $MgCO_3$ per 100 parts by weight of polymer (A), most preferably between 2 to 6 parts by weight of $MgCO_3$ per 100 parts by weight of polymer (A). Particularly good results have been obtained using 4 parts by weight of $MgCO_3$ per 100 parts by weight of polymer (A).

The nucleating agent advantageously provides sites for the formation of cells generated by the blowing agent. The use of nucleating agents results in a greater number of finer cells than would form without a nucleating agent.

To the purpose of the invention, the term "active" nucleating agent is intended to denote a compound which both acts as nucleating agent, as above described and, at the same time, participates in blowing, by at least partially decomposing to yield gaseous components.

The applicant has surprisingly found that the use of carbonates having decomposition temperature exceeding 350° C., and thus which are thermally stable at typical temperatures of processing of the polymer (A) is particularly useful, because these carbonates can be intimately admixed in the melt during processing and foaming within the per(halo) fluoropolymer matrix without significant decomposition, so as to obtain a very homogeneous distribution of nucleating sites.

Also, when combined with $MgCO_3$ or $CaCO_3$, these carbonates actively participate in evolving carbon dioxide during foaming process, thanks to the combined effect of acid evolvement and temperature. These active nucleating agents are particularly useful for blowing foams of polymer (A), as its intrinsic basicity enables capture and neutralization of eventual traces of HF acid which might evolve from the molten material. Also hydrogen fluoride can advantageously react with the metal carbonate forming carbon dioxide. It is believed that the formation of this carbon dioxide provides sites for initiation or nucleation of cells forming from the blowing agent.

As used here, a blowing agent comprising "primarily talc" achieves at least most of its blowing function from talc. In certain exemplary embodiments wherein the blowing agent comprises primarily talc, the blowing agent is at least 30 weight percent talc. That is, in such embodiments talc is at least 30 weight percent of all materials operative as a blowing agent in the composition in the intended extrusion or other forming operation. In certain exemplary embodiments the blowing agent is at least 10 weight percent talc. In certain exemplary embodiments the blowing agent is at least 20 weight percent talc. In certain exemplary embodiments the blowing agent consists essentially of talc. In certain exemplary embodiments talc is used in combination with other blowing agents, including, e.g., boron nitride and/or other known blowing agents as well as derivatives of talc.

Preferably up to 5 parts by weight of above mentioned active nucleating agent per 100 parts by weight of polymer (A) can be used. More preferably, there are about 0.5 to about 3 parts by weight of active nucleating agent per 100 parts by weight of polymer (F).

Additionally, the following working examples are representative of the present disclosure;

Working Example 1

A first composition including $MgCO_3$, $CaCO_3$ and AClyn® wax and a fine powder of the perfluoropolymer e.g. (MFA) are placed in a powder form and blended as a master batch in a high intensity mixer i.e. (Henschel type Powder Blender). The master batch of this first composition is (94.8%) e.g. (MFA) perfluoropolymer powder, 3.79% $MgCO_3$, 0.94% $CaCO_3$ and 0.47% AClyn® wax. This master batch of the first composition is further extruded into a pellet form in a second stage utilizing a twin screw extrusion process that allows for incorporating the master batch of the first composition at 20% sequentially along feeder sections of the twin screw while incorporating 80% perfluoropolymer base resin (e.g. FEP) with temperature zones 1 through 6 starting at 520, 530, 540, 560, 580, and 600 degrees Fahrenheit, respectively. This 80% pellet of base perfluoropolymer resin and the 20% powder master batch (of the first composition) are formed into a pellet via underwater pelletization.

A third composition includes talc (MgSiOH; $3MgO+4SiO_2+H_2O$; $MgOH+H_2O+SiOH$) or other talc/talc derivatives such as $Mg_3Si_4O_{10}(OH)_2$ which is/are sequentially added into the feeder section with a base perfluoropolymers resin e.g. (FEP) in a ratio of 15% talc and 85% perfluoropolymer resin. The process temperature of zones 1 through 6 of the twin screw extruder are 520, 530, 540, 560, 580, and 600 degrees Fahrenheit respectively. The extrusion of the base resin perfluoropolymer e.g. (FEP) is under water pelletized into a single pellet.

The first composition described above (that is $MgCO_3$, $CaCO_3$ and AClyn® wax)—as a pellet—is then tumble blended with the third composition (talc or talc derivative)—as a pellet—in a ratio of 5% of the first composition, 45% of the third composition and 50% of the base resin of perfluoropolymer e.g. (FEP). The aforementioned tumble blended materials are placed in the hopper of a 30 to 1 ratio high temperature extruder with heat zones 1 through 6 at 530, 550, 570, 600, 610, and 630 degrees to form one of several products including an extruded profile such as used for separators, wire insulation, or jackets for cabling.

Working Example 2

Two other alternatives may be used in the manufacturing process:

The first and third composition may be added in the aforementioned percentages (or varying other percentages depending on the required physio-chemical properties) and temperatures to manufacture a single compounded pellet, thereby eliminating the tumble blending requirement. The single composite pellet is then placed in the 30 to 1 ratio high temperature extruder with the aforementioned heat profile by zones to form one of several products including an extruded profile such as used for separators, wire insulation, or jackets for cabling.

Working Example 3

The third composition (with talc or talc derivative) may be tumble blended alone without the first composition in a 50/50 ratio with a base resin of a perfluoropolymer e.g. (FEP). The process temperatures of zones 1 through 6 of the 30 to 1 ratio high temperature extruder requires a slightly elevated temperature profile and pressure, in comparison with Examples 1 and 2 above. Temperature zones of 525, 535, 550, 580, 640 and 660 is necessary when the first composition (described in Working Example 1) is not included in the present formulation of this example in order to form one of several products including an extruded profile such as used for separators, wire insulation, or jackets for cabling.

Working Example 4

The tumble blending step described in Working Example 3, of the third composition (with talc) at a 50/50 ratio with the base polymer resin of a perfluoropolymer e.g. (talc), may be eliminated by the use of the aforementioned twin screw compounding equipment. The talc, instead, is added into the extruded melt of the base perfluoropolymer resin in sequential steps to accomplish a 7.5% loading of the talc in the perfluoropolymer resin. The temperature profile for zones 1 through 6 would be as follows: 520, 530, 540, 560, 580 and 600 degrees Fahrenheit. The process temperatures of this single compound pellet with 7.5% talc and 92.5% perfluoropolymer resin is then extruded on a 30 to 1 ratio high temperature extruder with temperature zones of 525, 535, 550, 580, 640 and 660 degrees Fahrenheit for the extrusion of profiles, insulations and jackets.

In the rest of the text, the expressions -melt-processable per(halo)fluoropolymer" and "polymer (A)" are understood, for the purposes of the invention, both in the plural and the singular, that is to say that the inventive composition may comprise one or more than one polymer (A).

Preferably, the composition of the invention comprises only one polymer (A).

The per(halo)fluoropolymer can comprise one or more halogen atoms (Cl, Br, I), different from fluorine.

The TFE copolymers as above detailed comprise advantageously at least 2% wt. preferably at least 5% wt, more preferably at least 7% wt of recurring units derived from the per(halo)fluoromonomer (PFM).

The TFE copolymers as above detailed comprise advantageously at most 30% wt, preferably at most 25% wt, more preferably 20% wt of recurring units derived from the per (halo)fluoromonomer (PFM).

Good results have been obtained with TFE copolymers as above detailed comprising at least 2% wt and at most 30% wt of recurring units derived from the per(halo)fluoromonomer (PFM).

1. perfluoro-oxyalkylvinylethers complying with general formula $CF_2=CFOX_0$, in which $X_0$ is a $C_1$-$C_{12}$ perfluorooxyalkyl having one or more ether groups, like perfluoro-2-propoxy-propyl group; and/or
2. $C_3$-$C_8$ perfluoroolefins, such as hexafluoropropene (HFP); and/or per(halo)fluorodioxoles of formula:

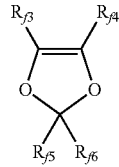

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$.

Composition according to claim 2, wherein the per(halo) fluoropolymers [polymers (A)] is selected among TFE copolymers comprising recurring units derived from at least one per(halo)fluoromonomer (PFM) chosen among the group consisting of:

1. perfluoroalkylvinylethers, as above defined; perfluorooxyalkylvinylethers, as above defined;
2. $C_3$-$C_8$ perfluoroolefins, as above defined.
3. According to a first embodiment of the invention, the polymer (A) is chosen among TFE copolymers comprising recurring units derived from HFP and optionally from at least one perfluoroalkylvinylether, as above defined.
4. Preferred polymers (A) according to this embodiment are selected among TFE copolymers comprising (preferably consisting essentially of) recurring units derived from tetrafluoroethylene (TFE) and hexafluoropropylene (HFP) in an amount ranging from 3 to 15 wt % and, optionally, from 0.5 to 3 wt % of at least one perfluoroalkylvinylether, as above defined.

The Applicant has surprisingly found that the use an active nucleating agent chosen among:

at least one metal carbonate different from magnesium carbonate having decomposition temperature exceeding 350° C., generally chosen among $CaCO_3$, $BaCO_3$, $ZnCO_3$ and $PbCO_3$;

at least one talc derivative;

and mixtures thereof, which are thermally stable at typical temperatures of processing of the polymer (A) is particularly useful, because these carbonates can be intimately admixed in the melt during processing and foaming within the per(halo)fluoropolymer matrix without significant decomposition, so as to obtain a very homogeneous distribution of nucleating sites.

Also, when combined with $MgCO_3$, these active nucleating agents actively participate in evolving carbon dioxide/water vapor during foaming process, thanks to the combined effect of acid evolvement and temperature. These active nucleating agents are particularly useful for blowing foams of polymer (A), as its intrinsic basicity enables capture and neutralization of eventual traces of HF acid which might evolve from the molten material. Also hydrogen fluoride can advantageously react with the metal carbonate forming carbon dioxide. It is believed that the formation of this carbon dioxide/water vapor provides sites for initiation or nucleation of cells forming from the blowing agent.

Preferably up to 5 parts by weight of above mentioned active nucleating agent per 100 parts by weight of polymer (A) can be used. More preferably, there are about 0.5 to about 3 parts by weight of active nucleating agent per 100 parts by weight of polymer (A).

The most preferred thermally stable metal carbonate is calcium carbonate. The particle size of the calcium carbonate can be up to about 10 microns, and is preferably from 0.1 to 0.3 microns. The calcium carbonate which is most preferred is a precipitated grade having an average diameter of about 0.03 microns. However, larger size particles have been successfully used, including particles having an average diameter size between 0.7 microns and 3.0 microns.

Particularly good results have been obtained using 1 part by weight of $CaCO_3$ per 100 parts by weight of polymer (A).

For the purpose of the invention, the term "talc derivative" is intended to denote a hydrate magnesium silicate mineral, typically having an exfoliated of fibrous crystal habit.

Typically, the talc derivative can comprise in addition to magnesium hydrosilicate of formula $3MgO.SiO_2.H_2O$ ($SiO_2$=63.5% wt, MgO=31.90% wt, $H_2O$=4.75% wt) other minerals such as magnesite, chlorite, calcite, magnetite, carbonate, dolomite.

Generally, the talc derivative has the following composition:

| | |
|---|---|
| $SiO_2$ | 35 to 65% wt. |
| MgO | 30 to 35% wt. |
| $FeO/Fe_2O_3$ | 0 to 6% wt. |
| $Al_2O_3$ | 0 to 15% wt. |
| CaO | 0 to 2% wt. |
| $CO_2$ | 0 to 15% wt. |
| $H_2O$ | 3 to 10% wt. |

The talc derivative has generally a density of 2.7 to 2.9 g/cm$^3$ and a specific surface area of 5 to 10 m$^2$/g (as determined by B.E.T. method using $N_2$ as gas).

Talc derivatives have been found particularly useful in combination with the $MgCO_3$ blowing agent in the composition of the invention. By introduction of talc as active nucleating agent, preferably in combination with at least one metal carbonate different from magnesium carbonate having decomposition temperature exceeding 350° C., it has been possible obtaining a very homogenous cell size distribution and a multiplicity of cells having small dimension.

According to a first embodiment of the invention, the composition comprises an active nucleating agent comprising at least one metal carbonate different from magnesium carbonate having decomposition temperature exceeding 350° C. The composition according to this first embodiment of the invention preferably comprises $CaCO_3$.

According to a second embodiment of the invention, the composition comprises an active nucleating agent comprising a talc derivative. Optionally, the composition can further comprise at least one metal carbonate different from magnesium carbonate having decomposition temperature exceeding 350° C., which synergistically cooperates with the talc derivative.

Preferably up to 20 parts by weight of above mentioned talc derivative per 100 parts by weight of polymer (A) can be used. More preferably, there are about 0.2 to about 3 parts by weight of talc derivative per 100 parts by weight of polymer (A).

The composition of the invention is preferably free from traditional chemical blowing agents; in other words, the magnesium carbonate and the active nucleating agent as above described, are preferably the unique components to behave as blowing agents, i.e. generating a blowing gas at processing temperatures of per(halo)fluoropolymer (A).

Typically, the composition of the invention is free from chemical blowing agents such as:
  hydrazodicarboxylates having the formula: ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and alkaryl radicals having from 7 to 10 carbon atoms. The most preferred blowing agent within this class being diisopropyl hydrazodicarboxylate.
  azocarbonamides, such as Azodicarbonamid (ADC);
  bis-suifohydrazides, such as, notably, oxi-bis-sulfo-hydrazid (OBSH), 25 Toluol-sulfo-hydrazid (TSH), Benzol-sulfo-hydrazid (BSH), oxybisenzenesulphonylhydrazide (OBSH);
  5-Phenyl-tetrazol derivatives (5-PT), e.g. barium salt thereof;
  semicarbazides, like para-toluol-sulfonyl-semicarbazid (PTSS);
  sodium boron hydride and derivatives thereof.

The composition of the present invention preferably comprises also a processing aid, which facilitate processing and improve surface aspect. Processing aids for fluoropolymers well-known to those skilled in the art can be used. Materials which have been found to yield particularly good results in the composition of the invention are processing aids based on polyolefin polymers, in particular on polyethylene polymers, more precisely on functionalized polyethylene polymers comprising acid functionalities, e.g. ethylene/acrylic acid copolymers, in general salified with appropriate salts. These materials, generally referred to as polyethylene ionomers, are notably commercially available under the trade mark AClyn® from Honeywell. The use of salified polyethylene ionomers is particularly advantageous, as these materials further cooperates in capturing acidity optionally generated during melt processing of the composition of the invention.

The composition of the present invention generally further contains at least one inert nucleating agent. There can be up to 30 parts of nucleating agent, preferably from 0.1 to 5 parts of nucleating agent per hundred parts of polymer (A).

The term "inert" nucleating agent is intended to the purpose of the invention as opposed to "active" nucleating agent, that is to say that the composition can comprise also a nucleating agent which is intended to only provide sites for the formation of cells generated by the blowing agent, and which does not participate in blowing my means of substantial decomposition phenomena yielding gaseous fluids.

According to an embodiment of the invention, the composition comprises an inert nucleating agent comprising titanium dioxide, at least one inorganic salt selected from the group consisting of lithium carbonate, calcium carbonate, calcium tetraborate, strontium carbonate, sodium carbonate sodium tetraborate, sodium sulfite, potassium tetraborate potassium pyrosulfate, potassium sulfate, barium nitrate, aluminum phosphate, sodium fluorosilicate and combinations thereof, and at least one sulfonic acid salt, phosphonic acid salt or combinations thereof.

The applicant has surprisingly found that this nucleating agent composition, which has been in the past applied with success to physical foaming of fluoropolymers using gaseous nitrogen as blowing agent (see U.S. Pat. No. 6,395,795), can be used with success also in chemical foaming (which indeed proceeds with completely different mechanism) in the compositions of the invention, in combination with $MgCO_3$ and thermally stable carbonates or talc derivatives, as above described.

The inert nucleating agent of this second embodiment preferably has about 50 ppm to about 2,000 ppm titanium dioxide by weight based on the total weight of the composition, about 25 ppm to about 3,000 ppm inorganic salt selected from the group selected from the group consisting of lithium carbonate, calcium carbonate, calcium tetraborate, strontium carbonate, sodium carbonate sodium tetraborate, sodium sulfite, potassium tetraborate potassium pyrosulfate, potassium sulfate, barium nitrate, aluminum phosphate, sodium fluorosilicate and combinations thereof by weight based on the total weight of the composition, and about 100 to about 3,000 ppm sulfonic acid salts, phosphonic acid salts or combinations thereof by weight based on the total weight of the composition.

Sodium tetraborate ($Na_2B_4O_7$) and calcium tetraborate ($CaB_4O_7$), however, are preferred, with sodium tetraborate being particularly preferred.

The sulfonic acid salts that are preferred in this invention are those salts of $CF_3CF_2(CF_2CF_2)_n CH_2CH_2SO_3X$ where X is either H or $NH_4$ and n=1-10, predominantly n=2-4, preferably the barium salt. A useful sulfonic acid salt for the invention is ZONYL® BAS, which is barium salt of ZONYL® TBS, both available from E.I. DuPont de Nemours and Company ("DuPont"), Wilmington, Del., USA. Other sulfonic acid salts that can be used are potassium perfluorooctane sulfonate sold under the trademark FLUORAD® FC-95, potassium perfluorobutane sulfonate (L-7038) both available from 3M, St. Paul, Minn., USA and perfluoroalkyl sulphonic acid available under the tradename FORAFAC® 01176 from Atofina Chemicals, Philadelphia, Pa., USA.

An inert nucleating agent which yielded particularly good results according to this embodiment of the invention was composed of 750 ppm of ZONYL® BAS, 250 ppm $TiO_2$ and 100 ppm Sodium Tetra Borate, with respect to the weight of polymer (A).

The present invention also concerns a process for the manufacture of the foamable composition as above detailed.

Generally, the process of the invention comprise dry blending of the polymer (A), the blowing agent based on magnesium carbonate; and the active nucleating agent, based on above detailed metal carbonates.

These materials can be blended in standard equipments well-known to those skilled in the art.

The polymer (A) to be used in the process of the invention is generally under the form of a powder having an average particle size comprised between 1 and 1500 µm, preferably between 50 and 1000 µm.

Typically, the composition of the invention can be manufactured as a powder mixture by dry blending the polymer (A), the blowing agent and the active nucleating agent, and all other optional ingredients, as above details, using high intensity mixers. Henschel-type mixers are preferred equipments. So obtained powder mixture can comprise the polymer (A), the blowing agent and the active nucleating agent in the weight ratios as above detailed, suitable for obtaining effective foaming, or can be a concentrated mixture to be used as masterbatch and diluted in further amounts of polymer (A) in subsequent processing steps.

It is also possible to manufacture the composition of the invention by further melt compounding the powder mixture as above described with or without an additional quantity of polymer (A).

It is generally preferred to incorporate the powder mixture as above described in an additional quantity of polymer (A).

Conventional melt compounding devices can be used. Preferably, extruders, more preferably twin screw extruders can be used. Specially flighted extruders, i.e. extruders specifically designed to effectively control temperature such that foaming or nucleation is not prematurely initiated and such that the composition may be melted, blended, extruded and palletized without premature foaming of the composition are particularly preferred.

The design of the compounding screw, e.g. flight pitch and width, clearance, length as well as operating conditions will be advantageously chosen so that sufficient heat and mechanical energy is provided to advantageously fully melt the powder mixture as above detailed and advantageously obtain a homogeneous distribution of the different ingredients, but still mild enough to advantageously keep the processing temperature of the composition below that in which foaming may be prematurely initiated.

Provided that the processing temperature is kept at most at 600° F. (315° C.), i.e. above the melting point of the polymer (A), but below the decomposition temperature of the blowing agent, it is advantageously possible to obtain extrudates of the composition of the invention which have not undergone significant foaming. Such strand extrudates can be chopped by means e.g. of a rotating cutting knife aligned downwards the die plate, generally with an underwater device, which assures perfect cutting knife to die plate alignment, and collected under the form of pellets, which can be used for the manufacture of final foamed parts.

Final foamed parts can be advantageously manufactured by melt processing the composition as above detailed at a predetermined temperature exceeding 600° F. (315° C.), above the melting point of the polymer (A) and the required temperature for the blowing agent: in these conditions, the magnesium carbonate and the active nucleating agents advantageously cooperate to yield chemically foamed final parts with no need of additional injection of gazes.

The skilled in the art would determine using standard techniques and routine work, temperature, power and residence time of the composition in the extruder so as to obtain final foamed parts having the desired void fraction or foaming level.

As a function of the extruder die, several different foamed parts can be obtained, including separators, wire insulators, jackets and the like.

Foamed articles obtained from the foamable composition as above described are also objects of the present invention.

The present invention also provides a method of making a communications cable having flame retardant properties comprising the steps of manufacturing the foamable composition as above defined at a temperature of at most 600° F. (315° C.), melt processing such composition at a predetermined temperature exceeding 600° F. (315° C.) above the melting point of the fluorinated polymer and the required temperature for the blowing agent, extruding a metered amount of the melted composition around an advancing electrical conductor and allowing the composition to foam and expand (e.g. to a thickness of typically less than 25 mil) to produce an insulated conductor with a chemically blown per(halo)fluoropolymer insulation.

A twisted pair of the insulated conductors may then be formed from two of the conductors and a jacket formed around the twisted pair to form a communications cable.

The layer of foamed fluorinated polymer insulating material surrounding the conductor can be applied in a relatively thin layer (generally less than about 25 mils) and has excellent uniformity of thickness and uniformity of electrical properties along the length of the wire. Further, the foamed per(halo) fluoropolymer insulation provides a cable having a high velocity of propagation which can meet very close manufacturing tolerances. The insulated wire can be produced at high throughput using traditional processing equipments.

Otherwise coaxial cables comprising a round conducting wire, surrounded by an insulating spacer, surrounded by a cylindrical conducting sheath, usually surrounded by a final insulating layer (jacket), generally having a nominal thickness of 0.008" can also be formed, the foamable composition of the invention being used the first insulating spacer and/or for the outer insulating layer (jacket). A thickness of 0.025" to 0.125" of the foamed insulating layer (spacer or jacket) is generally required, with a foaming level which ranges approximately between 2 and 60%.

The invention will be now described in more detail with reference to the following examples, whose purpose is merely illustrative and not intended to limit the scope of the invention.

Example 5

Manufacture of a Powder Mixture (Masterbatch Composition)

$MgCO_3$, $CaCO_3$ and AClyn® wax commercially available from Honeywell and a fine powder of HYFLON® MFA commercially available from Solvay Solexis Inc. were placed in a powder form and blended as a master batch in a high intensity mixer i.e. in a Henschel type Powder Blender. The composition of this powder mixture was the following:
  94.8% of MFA powder;
  3.79% $MgCO_3$;
  0.94% $CaCO_3$;
  0.47% AClyn® wax.

Example 6

Manufacture of a Pelletized Foamable Composition

This master batch prepared as detailed in example 1 was further extruded into a pellet form utilizing a twin screw extrusion process.

The powder mixture of example 1 was thus incorporated in a per(halo)fluoropolymer resin, namely TEFLON® FEP in a weight ratio powder mixture/per(halo)fluoropolymer 20/80 by sequential additions through the feeder sections of the twin screw extruder. Temperature profile in the melt twin screw extruder was the following (from zone 1 to 6): 520° F. (270° C.), 530° F. (277° C.), 540° F. (282° C.), 560° F. (293° C.), 580° C. (304° C.), and 600° F. (315° C.). The extruder was equipped with an underwater pelletizer providing pellets of the composition as above detailed with constant and regular shape.

Example 7

Manufacture of a Powder Mixture of Polymer (A) and Talc Derivative (Masterbatch Composition)

A talc derivative of chemical composition $Mg_3Si_4O_{10}(OH)$ was melt compounded with a per(halo)fluoropolymer resin, namely TEFLON® FEP in a weight ratio talc/per(halo)fluoropolymer 15/85 w/w, in a twin screw extruder with underwater pelletizer, with the following temperature profile: 520° F. (270° C.) 530° F. (277° C.) 540° F. (282° C.), 560° F. (293° C.), 580° C. (304° C.), and 600° F. (315° C.).

Example 8

Manufacture of Foamable Compositions from a Mixture of Pellets of Example 2 and Example 3

Pellets obtained from example 2 and pellets obtained from example 3 were tumble blended with base resin TEFLON® FEP in the following weight ratio (pellets of ex. 2)/(pellets of ex. 3)/polymer (A)=5/45/50.

The aforementioned tumble blended materials were then placed in the hopper of a 30 to 1 ratio high temperature extruder with heat zones 1 through 6 set at the following temperatures 530° F. (277° C.), 550° F. (288° C.), 570° F. (299° C.), 600° F. (315° C.), 610° F. (320° C.), and 630° F. (330° C.) to form one of several foamed articles including an extruded profile such as used for separators, wire insulation, or jackets for cabling.

Foamable articles were found to possess an outstanding cells structure, with tunable foaming level, and outstanding insulating properties as described in the following working examples;

Working Example 9

A foamed perfluoropolymer insulation was extruded over 24 gage wire by using a cross head with a tip and die. The extruder was a high temperature 1½ inch, 30:1 ratio device. The screw design was a 4:1 high compression screw. The line speeds were in a range from 400 ft/min. to 1200 ft/min. The screw rpm were from 12 rpm to 35 rpm with pressure ranging from 1500 psi to 2000 psi. The melt temperature was 678 F. The extruder was loaded with pellets containing 10% talc and 90% FEP. This resulted in an insulation extrudate that was 41% foamed with an average foamed cell size of 0.0007 inches.

Working Example 10

A cross web cable support-separator was manufactured with a 1½ inch high temperature extruder using the following materials and conditions;

Use of a cross web die with a high compression screw, a line speed of 148 ft./min. at a pressure of 1700 psi with a 48 RPM screw speed and a melt temperature of 649 F. The extruder was loaded with a pellet master batch, the pellet comprising 15% talc and 85% FEP. The pellet master batch was blended in a 50:50 ratio with 100% FEP. Therefore, the final blend ratio was 50% master batch pellets and 50% FEP. This resulted in a cross web extrudate that was 40% foamed with an average foamed cell size of 0.0006 inches.

Working Example 11

A Double Helix cable support-separator was manufactured using a 1½ inch extruder with the following materials and conditions;

A web cable support-separator was manufactured using a profile extrusion die with a high compression screw, a line speed of 75 ft./min. at a pressure of 1850 psi with a 40 RPM screw speed and a melt temperature of 646 F. The extruder was loaded with master batch pellets containing 15% talc and 85% FEP. This master batch was blended with 100% FEP. The final blend ratio was 70% master batch pellets and 30% FEP. This resulted in a web extrudate that was 33% foamed with an average foamed cell size of 0.0007 inches.

Working Example 12

A foamed perfluoropolymer insulation was extruded over 24 gage wire by using a cross head with a tip and die. The extruder was a high temperature 1½ inch, 30:1 ratio device. The screw design was a 4:1 high compression screw. The line speeds were in a range from 300 ft/min. to 900 ft/min. The screw rpm were from 12 rpm to 30 rpm with pressure ranging from 1500 psi to 2000 psi. The melt temperature was 680 F. The extruder was loaded with pellets containing 10% talc and 90% FEP. This resulted in an insulation extrudate that was 35% foamed with an average foamed cell size of 0.0007 inches.

Other desired embodiments, results, and novel features of the present invention will become more apparent from the following drawings, detailed description of the drawings, and the accompanying claims.

BRIEF DESCRIPTION OF THE DRAWING

FIG. 1 is a schematic which are representative of processes used to produce the disclosed compositions.

DETAILED DESCRIPTIONS OF DRAWING

The following description will further help to explain the inventive features of the system, method and compositions of the present disclosure.

There are four distinct compositions that are created by the system and are noted as a first composition [100], a second composition [200], a third composition [300] and a fourth composition [400]. The first composition comprises a blend of selected perfluoropolymer [110], magnesium carbonate ($MgCO_3$) [120], calcium carbonate ($CaCO_3$) [130], and AClyn® wax [140] as a powder blend mixed homogeneously. The second composition [200] is a blowing or foaming agent comprised of the first composition [100] and a selected perfluoropolymer [110] that is melted by heat, blended, extruded and pelletized by a specially flighted extruder [250] wherein the extruder is specifically designed to minimize heat transfer such that foaming or nucleation is not prematurely initiated and such that the composition may be melted, blended, extruded and pelletized without premature foaming of the composition. The third composition which is a nucleating agent is comprised of a selected perfluoropolymer [110] and talc (magnesium silicate hydroxide or other talc derivative) ($Mg_3Si_4O_{10}(OH)_2$) which is blended, melted by heat extruded and pelletized in a specially flighted extruder [350]. The fourth composition [400] is comprised of the second composition [200] and the third composition [300] which are tumble blended for use in a profile extruder [450].

The first composition [100] comprises a selected perfluoropolymer [110] that may be MFA, FEP, or PFA, as a selected, uniform, pure perfluoropolymer [110] or as a mixture of one or more different perfluoropolymers [110] at or about 94.8 percent by weight. The perfluoropolymer [110], magnesium carbonate [120] at or about 3.79 percent, calcium carbonate [130] at or about 0.94 percent and AClyn® wax [140] at or about 0.47 percent are mixed into a homogeneous powder in a Henschel blender.

The second composition [200] is comprised of the first composition [100] and a selected perfluoropolymer [110]. The ratio of perfluoropolymer [110] to first composition [100] is at or about 80 percent to at or about 20 percent by weight. The perfluoropolymer [110] may be MFA, FEP, or PFA, as a selected, uniform, pure perfluoropolymer [110] or as a mixture of one or more different perfluoropolymers [110]. The perfluoropolymer [110] may be substituted with fluoropolymer [115]. The first composition [100] and selected perfluoropolymer [110] are then placed in a extruder that minimizes mechanical shear and increased heating thereby mitigating premature foaming [250] during the process of melting blending, extruding and pelletizing.

The third composition [300] is comprised of magnesium silicate hydroxide, commonly known as talc [310] and perfluoropolymer [110]. The ratio of talc [310] is at or about 15 percent with the perfluoropolymer [110] at or about 85 percent by weight, however the talc [310] may range in concentration from 0.2 to 20 percent. The perfluoropolymer [110] component of the third composition [300] may be MFA, FEP, or PFA, as a selected, uniform, pure perfluoropolymer or as a mixture of one or more different perfluoropolymers [110] or 100 percent recycled and/or blended with non-recycled perfluoropolymers [110] in any ratio from 1 to 99 percent. The third composition [300] is then placed in an extruder specifically designed to minimize heat transfer such that foaming or nucleation is not prematurely initiated [350] and such that the composition may be melted, blended, extruded and pelletized. Additionally, an organic or inorganic salt [320] may be added to the third composition [300].

The fourth composition [400] is comprised of the second composition [200] and third composition [300]. In pellet form, it is tumble blended at a ratio of 30 percent of the second composition [200] and 70 percent of the third composition [300]. It is also possible to form chemically foamed or gas injected foamed components [600] using 100 percent of the third composition [300] only. An additional blend of the fourth composition [400] includes approximately a 35 percent second composition [200], a 30 percent third composition [300] and 35 percent of a selected perfluoropolymer [110]. The blended fourth composition [400] or third composition alone [300] is then ready for use in profile extrusion. The fourth composition [400] may also comprise inorganic and/or organic additives that include inorganic salts, metallic oxides, silica and silicon oxides as well as substituted and unsubstituted fullerenes. Any combination of compositions [200], [300], and [400] may be combined in any ratio to form a single pelletized product or may be individually pelletized to form a single pelletized product.

The profile extrusion unit [450] may optionally utilize air or inert gas in addition or in lieu of chemical foaming to adjust the cellular size of the foamed end products [600] which are high performance multi-media cable insulative components [500] for example: wire insulation [510], fiber optic sheathing

[520], cable support-separators [530], jacketing [540], wraps [550] and tapes [560]. The blown or foamed insulative components [600] exhibit a smaller and more consistent cell structure than has been previously achieved and at a lower cost than any known present methods.

It will, of course, be appreciated that the system, method and compositions that have been described have been given simply by the way of illustration, and the disclosure is not limited to the precise embodiments described herein; various changes and modifications may be effected by one skilled in the art without departing from the scope or spirit of the invention as defined in the inventive claims.

What is claimed is:

1. A method for manufacturing a foamed article comprising:
   providing a composition comprising a melt-processable perfluoropolymer and talc, said perfluoropolymer comprising at least 50 percent by weight of said composition and said talc comprising, about 2 percent to 3 percent by weight of said composition; wherein said melt-processable perfluoropolymer is selected from the group consisting of tetrafluoroethylene/perfluoromethylvinyl ether copolymer (MFA), hexafluoropropylene/tetrafluoroethylene copolymer (FEP), perfluoroalkoxy (PFA) and any blend thereof,
   heating said composition to a processing temperature of at least 600° F. at which said talc functions as a chemical foaming agent, thereby causing the foaming of said composition at a foaming rate in a range from 20% to 50% so as to form a foamed article,
   wherein said talc is the only foaming agent in said composition and wherein said foaming is achieved without gas injection, and
   wherein hydrogen-containing fluoropolymers are absent from the composition.

2. The method of claim 1, wherein said processing temperature is in a range of 600° F. to 660° F.

3. The method of claim 1, wherein said processing temperature is in a range of 630° F. to about 660° F.

4. The method of claim 1, wherein said processing temperature is in a range of 640° F. to about 660° F.

5. The method of claim 1, wherein said talc includes recycled talc.

6. The method of claim 1, wherein said perfluoropolymer comprises recycled perfluoropolymer.

7. The method of claim 1, wherein said foamed article comprises any of a separator, wire insulation or cable jacketing.

8. The method of claim 1, further comprising extruding said foaming composition to form said foamed article.

9. The method of claim 1, further comprising mold processing said foaming composition to form said foamed article.

* * * * *